(12) United States Patent
Hosono et al.

(10) Patent No.: US 9,983,839 B2
(45) Date of Patent: May 29, 2018

(54) IMAGE PROCESSING APPARATUS AND NON-TRANSITORY COMPUTER-READABLE RECORDING MEDIUM ENCODED WITH MODE SWITCHING PROGRAM

(71) Applicant: Konica Minolta, Inc., Tokyo (JP)

(72) Inventors: Masao Hosono, Hyogo-ken (JP); Shigeyuki Ueda, Tokyo (JP); Tadashi Suzue, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 15/621,479

(22) Filed: Jun. 13, 2017

(65) Prior Publication Data

US 2017/0357471 A1 Dec. 14, 2017

(30) Foreign Application Priority Data

Jun. 13, 2016 (JP) .................................. 2016-117177

(51) Int. Cl.
*G06F 3/12* (2006.01)
*H04N 1/00* (2006.01)

(52) U.S. Cl.
CPC .......... *G06F 3/1297* (2013.01); *G06F 3/1205* (2013.01); *G06F 3/1207* (2013.01); *G06F 3/1221* (2013.01); *G06F 3/1228* (2013.01); *G06F 3/1285* (2013.01); *H04N 1/00896* (2013.01); *H04N 1/00938* (2013.01); *H04N 2201/0094* (2013.01)

(58) Field of Classification Search
CPC .... G06F 3/1297; G06F 3/1228; G06F 3/1205; G06F 3/1207; G06F 3/1285; G06F 3/1221; H04N 1/00938; H04N 1/00896; H04N 2201/0094

USPC ........................................................ 358/1.13
See application file for complete search history.

(56) References Cited

U.S. PATENT DOCUMENTS

2005/0226641 A1* 10/2005 Ando ..................... G03G 15/00
399/8
2009/0235102 A1 9/2009 Koshika et al.
2009/0316177 A1* 12/2009 Ito ....................... G06F 9/44584
358/1.13

(Continued)

FOREIGN PATENT DOCUMENTS

JP 2008-310664 A 12/2008
JP 2009-211310 A 9/2009

(Continued)

*Primary Examiner* — Allen H Nguyen
(74) *Attorney, Agent, or Firm* — Osha Liang LLP

(57) ABSTRACT

An image processing apparatus includes a volatile first storage, a non-volatile second storage, a host controller, a guest controller, an emulator that emulates access to the first storage and the second storage by the host controller such that the guest controller accesses the first storage and the second storage, and an application portion that controls the host controller to access the first storage and the second storage. Any one of the application portion and the emulator includes a transfer portion that stores data that is stored in a predetermined region of the second storage in a certain region of the first storage before the application portion stops the second storage. The emulator includes an access destination converter that converts access to the second storage by the guest controller into access to the certain region of the first storage after the second storage is stopped.

12 Claims, 15 Drawing Sheets

(56) References Cited

U.S. PATENT DOCUMENTS

| | | | |
|---|---|---|---|
| 2012/0011506 A1 | 1/2012 | Iwamatsu et al. | |
| 2014/0043632 A1* | 2/2014 | Uchida | G06F 3/1297 358/1.13 |
| 2014/0043634 A1 | 2/2014 | Haga et al. | |
| 2016/0198055 A1* | 7/2016 | Kubo | H04N 1/00493 358/1.13 |

FOREIGN PATENT DOCUMENTS

| | | |
|---|---|---|
| JP | 2012-018515 A | 1/2012 |
| JP | 2014-038391 A | 2/2014 |

* cited by examiner

F I G. 13
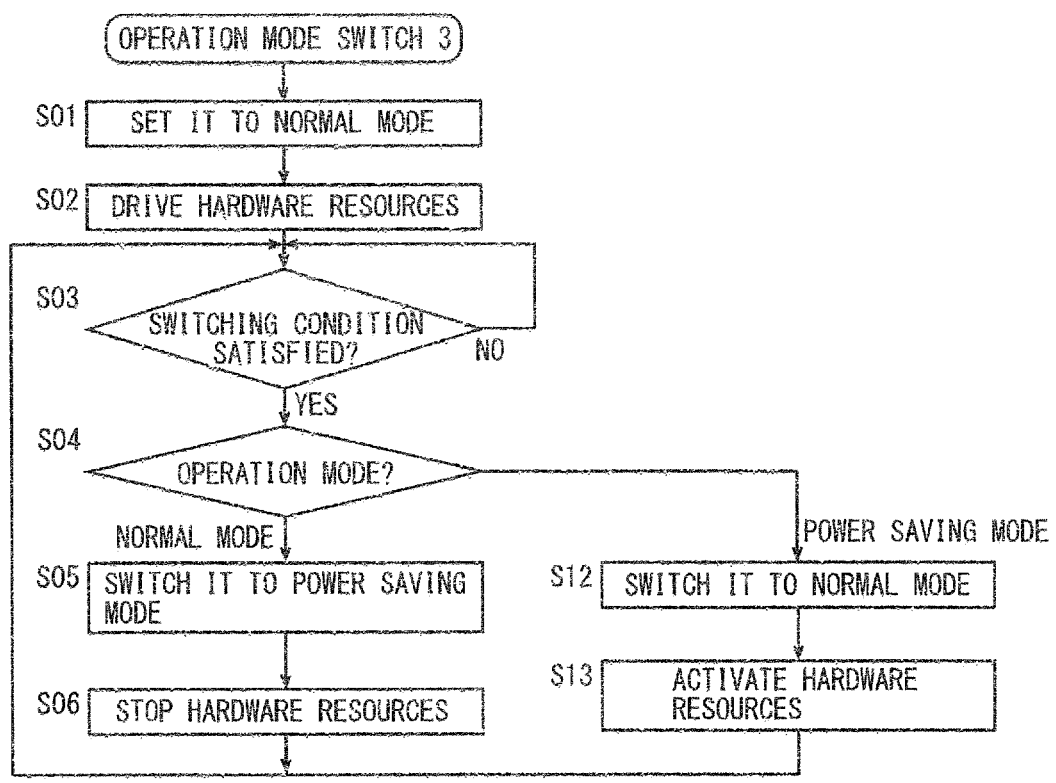

IMAGE PROCESSING APPARATUS AND NON-TRANSITORY COMPUTER-READABLE RECORDING MEDIUM ENCODED WITH MODE SWITCHING PROGRAM

This application is based on Japanese Patent Application No. 2016-117177 filed with Japan Patent Office on Jun. 13, 2016, the entire content of which is hereby incorporated by reference.

BACKGROUND

Field of the Invention

The present invention relates to an image processing apparatus and a non-transitory computer-readable recording medium encoded with a mode switching program. In particular, the present invention relates to an image processing apparatus in which a plurality of operating systems are installed and a non-transitory computer-readable recording medium encoded with a mode switching program executed in the image processing apparatus.

Description of the Related Art

In recent years, a hypervisor has been known as a virtualization technique for realizing a virtual machine. In an MFP (Multi Function Peripheral) represented by an image processing apparatus for processing images, if the virtual machine is realized, various types of application programs can be executed in the MFP. On the other hand, in the case where the MFP is not used, it is desirable that a state of the MFP is changed to a power saving state for the request to save power.

For example, Japanese Patent Application Laid-Open No. 2012-18515 discloses an information processing apparatus, including a device, that includes a plurality of guest virtual machines that execute processes for the device, a device driver virtual machine that executes an access process to the device on behalf of the plurality of guest virtual machines, a counter that, as for each of the plurality of guest virtual machines accessing the device via the device driver virtual machine, counts an elapsed time period in which one of the plurality of guest virtual machines and the device are not accessing each other as a non-access time period, a storage that stores operation profile information that associates the non-access time period with operation mode information indicating an operation mode of the device, a determiner that determines an operation mode with reference to the operation profile information based on the counted non-access time period, and a transition controller that changes the operation mode of the device to the determined operation mode.

However, depending on an application program installed in the MFP, there is a program required to be executed without being stopped even in a power saving state. For example, in the case where an operation mode of a device that is not used by an application program executed in a first guest virtual machine is changed to a power saving operation mode, the device is sometimes used by an application program executed in a second guest virtual machine. In this case, the second guest virtual machine cannot be informed of the change, of the operation mode of the device to the power saving operation mode, made by the first guest virtual machine. Therefore, the second guest virtual machine cannot access the second guest virtual machine or that it takes time to activate the device.

SUMMARY

According to one or more embodiments of the present invention, an image processing apparatus includes a hardware processor, a volatile first storage, and a non-volatile second storage, wherein the hardware processor includes a host controller that is formed by execution of a first operating system program and controls the first storage and the second storage, a guest controller that is formed by execution of a second operating system program, an emulator that emulates access to the first storage and the second storage by the host controller such that the guest controller accesses the first storage and the second storage, and an application portion that is formed by execution of an application program and controls the host controller in order to access the first storage and the second storage, any one of the application portion and the emulator includes a transfer portion that, before the application portion stops the second storage, stores data, stored in a predetermined region of the second storage, in a certain region of the first storage, and the emulator includes an access destination converter that, after the second storage is stopped by the application portion, converts access to the second storage by the guest controller into access to the certain region of the first storage.

According to one or more embodiments of the present invention, an image processing apparatus comprising a hardware processor, a volatile first storage, and a non-volatile second storage, the hardware processor including a host controller that is formed by execution of a first operating system program and controls the first storage and the second storage, a guest controller that is formed by execution of a second operating system program, and an application portion that is formed by execution of an application program and controls the host controller in order to access the first storage and the second storage, wherein the host controller includes a hypervisor that controls access to the first storage and the second storage by the guest controller, the guest controller includes a virtual driver for controlling the hypervisor in order to access the second storage, and the hypervisor includes a transfer portion that, before the second storage is stopped by the application portion, stores data, stored in a predetermined region of the second storage, in a certain region of the first storage, and an access destination converter that, after the second storage is stopped, converts access to the second storage by the virtual driver into access to the certain region of the first storage.

According to one or more embodiments of the present invention, a non-transitory computer-readable recording medium encoded with an operation mode switching program that includes an application program and an emulate program which are executed by a computer that controls an image processing apparatus, the image processing apparatus comprising a volatile first storage, and a non-volatile second storage, the computer comprising a host operating system that executes a first operating system program and controls the first storage and the second storage, a guest operating system that executes a second operating system program, an emulate task that is formed by execution of the emulate program, and emulates access to the first storage and the second storage by the host operating system such that the guest operating system accesses the first storage and the second storage, and an application task that is formed by execution of the application program and controls the host operating system in order to access the first storage and the second storage, and the computer causing any one of the application task and the emulate task to perform a transfer step of, before the application task stops the second storage, storing data, stored in a predetermined region of the second storage, in a certain region of the first storage, and the emulate task to perform an access destination conversion step of, after the second storage is stopped by the application task, converting access to the second storage by the guest operating system into access to the certain region of the first storage.

According to one or more embodiments of the present invention, a non-transitory computer-readable recording medium encoded with an operation mode switching program that is executed by a computer that controls an image processing apparatus, the image forming apparatus comprising a volatile first storage, and a non-volatile second storage, and the computer comprising a host operating system that executes a first operating system program and controls the first storage and the second storage, a guest operating system that executes a second operating system program, and an application task that is formed by execution of an application program and controls the host operating system in order to access the first storage and the second storage, wherein the host operating system includes a hypervisor that is formed in the case where the computer executes the operation mode switching program included in the first operating system program, and controls access to the first storage and the second storage by the guest operating system, the guest operating system includes a virtual driver for controlling the hypervisor in order to access the second storage, and the guest operating system causes the hypervisor to perform a transfer step of, before the second storage is stopped by the application task, storing data, stored in a predetermined region of the second storage, in a certain region of the first storage, and an access destination conversion step of, after the second storage is stopped, converting access to the second storage by the virtual driver into access to the certain region of the first storage.

The foregoing and other features, aspects, and advantages of one or more embodiments of the present invention will become more apparent from the following detailed description when taken in conjunction with the accompanying drawings.

BRIEF DESCRIPTION OF THE DRAWINGS

FIG. 13 is a flow chart showing one example of a flow of an operation mode switching process in accordance with one or more embodiments;

DETAILED DESCRIPTION

Figure 1:
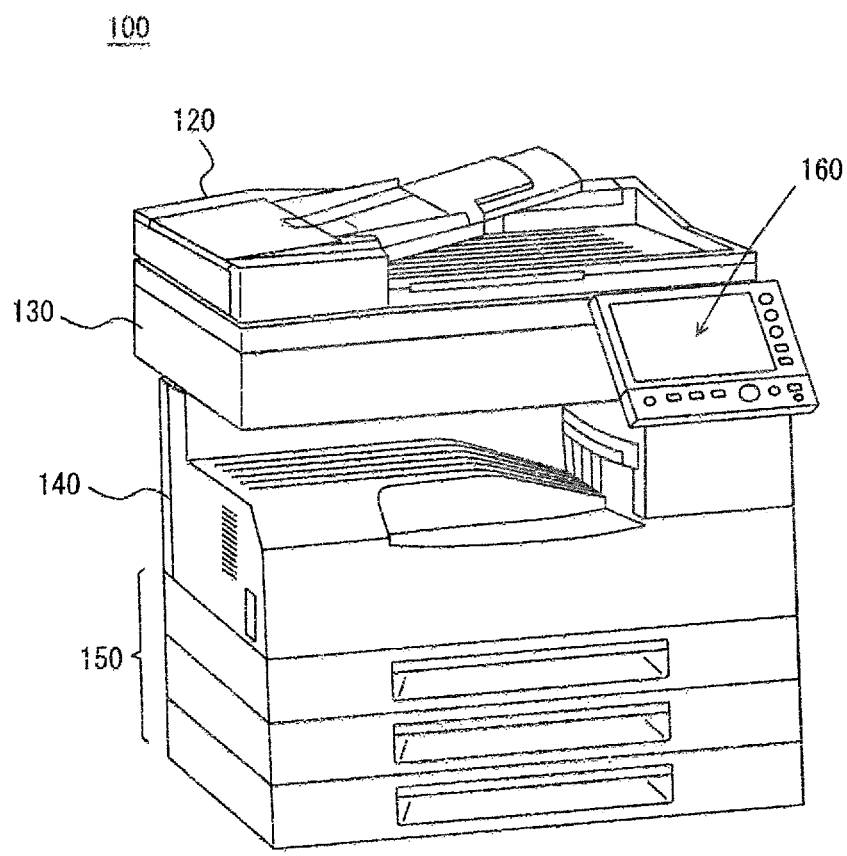
FIG. 1 is a perspective view showing the appearance of an MFP in accordance with one or more embodiments.

Embodiments of the present invention will be described below with reference to the drawings. In the following description, the same parts are denoted with the same reference characters. Their names and functions are also the same. Thus, a detailed description thereof will not be repeated.

Figure 2:
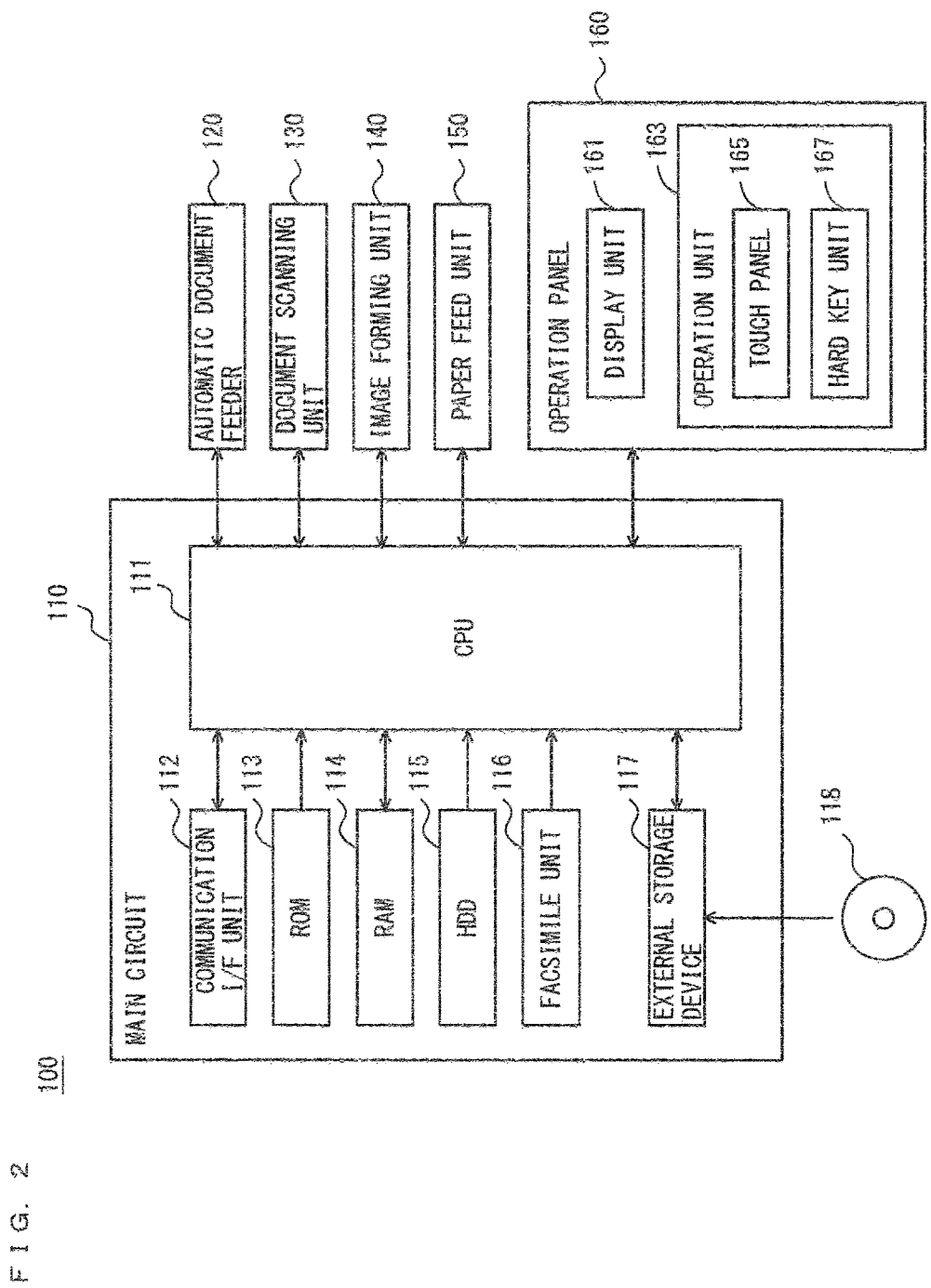
FIG. 2 is a block diagram showing an outline of a hardware configuration of the MFP in accordance with one or more embodiments.

FIG. 1 is a perspective view showing the appearance of an MFP in accordance with one or more embodiments. FIG. 2 is a block diagram showing an outline of a hardware configuration of the MFP in accordance with one or more embodiments. Referring to FIGS. 1 and 2, the MFP 100 that functions as an image forming apparatus includes a main circuit 110, a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned the document, a paper feed unit 150 for supplying sheets of paper to the image forming unit 140 and an operation panel 160 serving as a user interface.

The main circuit 110 includes a CPU (Central Processing Unit) 111, a communication interface (I/F) unit 112, a ROM 113, a RAM 114, a hard disk drive (HDD) 115 as a mass storage, a facsimile unit 116, and an external storage device 117 on which a CD-ROM (Compact Disk ROM) 118 is mounted. The CPU 111 is connected to the automatic document feeder 120, the document scanning unit 130, the image forming unit 140, the paper feed unit 150 and the operation panel 160, and controls the entire MFP 100.

The ROM 113 stores a program executed by the CPU 111 or data necessary for execution of the program. The RAM 114 is used as a work area when the CPU 111 executes a program.

The communication I/F unit 112 is an interface for connecting the MFP 100 to a network. The CPU 111 communicates with a computer connected to the network via the communication I/F unit 112, and transmits and receives data. Further, the communication I/F unit 112 can communicate with a computer connected to the Internet via the network.

The facsimile unit 116 is connected to the public switched telephone networks (PSTN) and transmits facsimile data to or receives facsimile data from the PSTN. The facsimile unit 116 stores the received facsimile data in the HDD 115 or outputs the received facsimile data to the image forming unit 140. The image forming unit 140 prints the facsimile data received by the facsimile unit 116 on a sheet of paper. Further, the facsimile unit 116 converts the data stored in the HDD 115 into facsimile data, and transmits the facsimile data to a facsimile device connected to the PSTN.

The external storage device 117 is mounted with the CD-ROM 118. The CPU 111 is capable of accessing the CD-ROM 118 via the external storage device 117. The CPU 111 loads a program, recorded in the CD-ROM 118 which is mounted on the external storage device 117, into the RAM 114 for execution. It is noted that the medium for storing the program executed by the CPU 111 is not limited to the CD-ROM 118. It may be an optical disk (MO (Magnetic Optical Disk)/MD (Mini Disk)/DVD (Digital Versatile Disk)), an IC card, an optical card, and a semiconductor memory such as a mask ROM, an EPROM (Erasable Programmable ROM) and an EEPROM (Electrically EPROM).

Further, the program executed by the CPU 111 is not restricted to the program recorded in the CD-ROM 118, and the CPU 111 may load a program, stored in the HDD 115, into the RAM 114 for execution. In this case, another computer connected to the network may rewrite the program stored in the HDD 115 of the MFP 100, or may additionally write a new program therein. Further, the MFP 100 may download a program from another computer connected to the network, and store the program in the HDD 115. The program referred to here includes not only a program directly executable by the CPU 111 but also a source program, a compressed program, an encrypted program or the like.

The operation panel 160 includes a display unit 161 and an operation unit 163. The display unit 161 is a Liquid Crystal Display (LCD) device or an organic ELD (Electroluminescence Display) device, for example, and displays instruction menus to users, information about the acquired image data, and the like. The operation unit 163 includes a touch panel 165 and a hard key unit 167. The touch panel 165 is a capacitance type. Not only the capacitance type but also another type such as a resistive film type, a surface acoustic wave type, an infrared type and an electromagnetic induction type can be used for the touch panel 165. The hard key unit 167 includes a plurality of hard keys. The hard keys are contact switches, for example.

Figure 3:
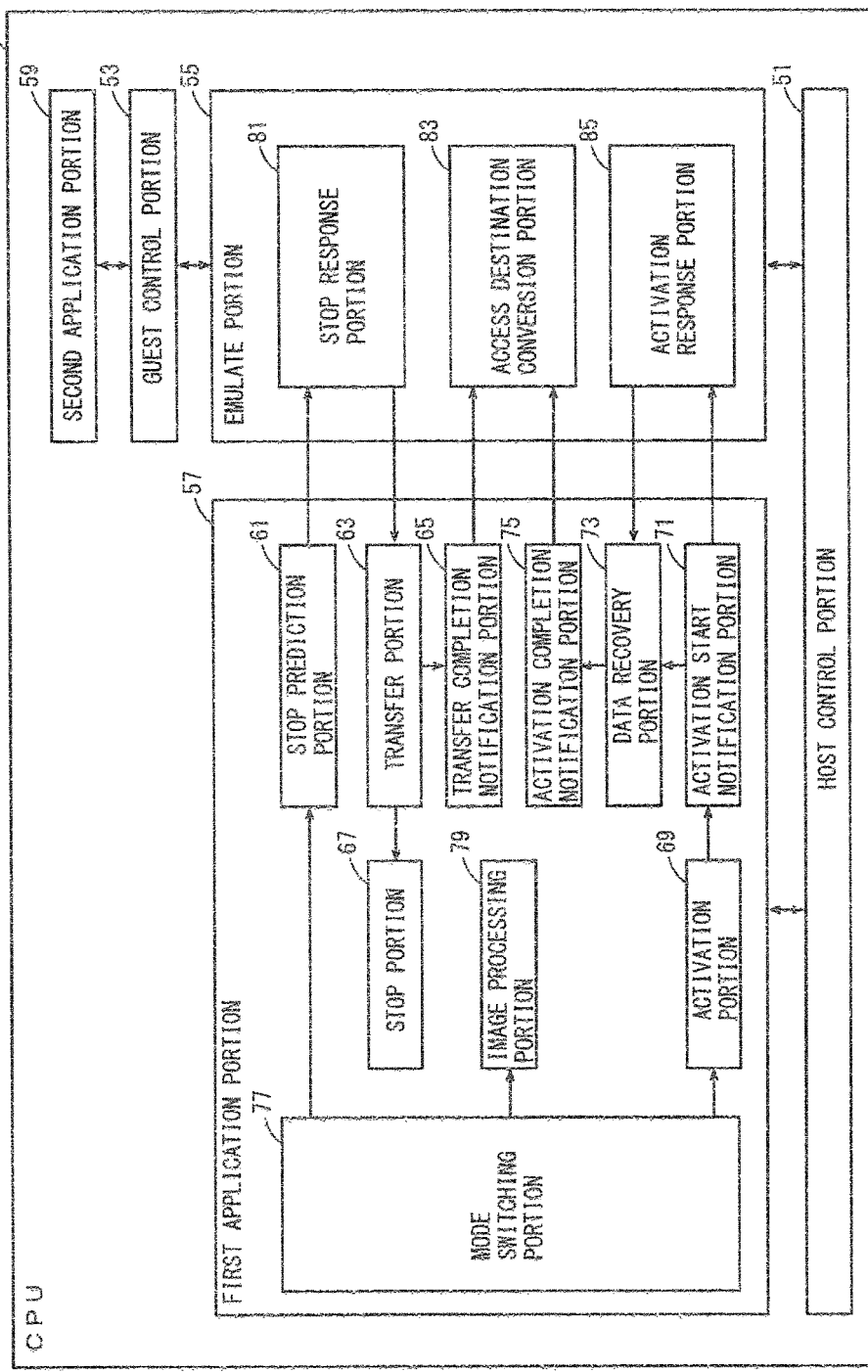
FIG. 3 is a diagram showing one example of functions of a CPU included in the MFP in accordance with one or more embodiments.

FIG. 3 is a diagram showing one example of functions of the CPU included in the MFP in accordance with one or more embodiments. Referring to FIG. 3, the CPU 111 includes a host control portion 51, a guest control portion 53, an emulate portion 55, a first application portion 57 and a second application program 59.

The host control portion 51 is a task formed in the case where the CPU 111 executes a first operating system program. The host control portion 51 controls hardware resources included in the MFP 100. The hardware resources include the automatic document feeder 120, the document scanning unit 130, the image forming unit 140, the paper feed unit 150 and the operation panel 160 in addition to the communication I/F unit 112, the ROM 113, the RAM 114, the HDD 115, the facsimile unit 116 and the external storage device 117 included in the main circuit 110.

The guest control portion 53 is a task formed in the case where the CPU 111 executes a second operating system program. The second operating system program is different from the first operating system program.

The emulate portion 55 is formed in the case where the CPU 111 executes an emulate program. The emulate program is an application program compatible with the first operating system program. The emulate portion 55 is a virtual device for the guest control portion 53, and emulates the control of the hardware resources by the host control portion 51. The emulate portion 55 allows the guest control portion 53 to function as a virtual machine. Thus, the guest control portion 53 can control the hardware resources included in the MFP 100.

The first application portion 57 is a task formed in the case where the CPU 111 executes a first application program compatible with the first operating system program. The first application portion 57 controls the host control portion 51, thereby being capable of controlling the hardware resources included in the MFP 100.

Each of the first application portion 57 and the emulate portion 55 can control the host control portion 51 and is managed by the host control portion 51. Therefore, the first application portion 57 and the emulate portion 55 can identify each other, thereby being capable of communicating with each other by using inter-process communication or the like.

The second application portion 59 is a task formed in the case where the CPU 111 executes a second application program compatible with the second operating system program. The second application portion 59 controls the guest control portion 53, thereby being capable of controlling the hardware resources included in the MFP 100.

The first application portion 57 includes a mode switching portion 77 that switches operation modes of the MFP 100, an image processing portion 79 that processes image data, a stop prediction portion 61, a transfer portion 63, a transfer completion notification portion 65, a stop portion 67, an activation portion 69, an activation start notification portion 71, a data recovery portion 73 and an activation completion notification portion 75.

The image processing portion 79 controls the hardware resources included in the MFP 100 and processes the image data. The processes that can be executed by the image processing portion 79 include, for example, a scan process of controlling the automatic document feeder 120 and the document scanning unit 130 and scanning a document to output the image data, a facsimile transmission reception process of controlling the facsimile unit 116 and transmitting and receiving facsimile data that is the image data, a data transmission reception process of controlling the communication I/F unit 112 and transmitting and receiving the image data, an image data management process of controlling the HDD 115, and an image forming process of controlling the image forming unit 140 and the paper feed unit 150 and forming an image of the image data on a sheet of paper. The image data management process includes a process of storing the image data in the HDD 115, a process of scanning the image data stored in the HDD 115, and a process of editing and deleting the image data stored in the HDD 115. The image processing portion 79 executes a process in accordance with an operation of inputting in the operation unit 163 by a user. Further, the image forming portion 79 executes a process in response to reception of a print job, defining a process of forming an image of the image data, by the communication I/F unit 112 or reception of facsimile data by the facsimile unit 116.

In the case where executing an image process, the image processing portion 79 stores image data to be processed in the RAM 114. Therefore, in the RAM 114, a region for storing the image data to be processed by the image processing portion 79 is defined in advance. The predetermined region for storing the image data in the RAM 114 is referred to as an image region.

The mode switching portion 77 switches an operation mode of the MFP 100 to any one of a normal mode, and a power saving mode in which the power consumption is lower than the power consumption in the normal mode. In the case where the below-mentioned state continues for a predetermined time period with the operation mode being the normal mode, the mode switching portion 77 switches the operation mode to the power saving mode, the state being a state where the operation unit 163 does not accept an operation by the user, the communication I/F unit 112 does not receive a print job, and the facsimile unit 116 does not receive facsimile data. Further, with the operation mode being the power saving mode, in the case where the operation unit 163 accepts an operation by the user, the case where the communication I/F unit 112 receives a print job, or the case where the facsimile unit 116 receives facsimile data, the mode switching portion 77 switches the operation mode to the normal mode. In the case where switching the operation mode to the power saving mode, the mode switching portion 77 stops the hardware resources except for the RAM 114 and the HDD 115. Thus, the power consumed by the hardware resources except for the RAM 114 and the HDD 115 can be reduced. As for the communication I/F unit 112 and the facsimile unit 116, with the operation mode being the power saving mode, the power is still consumed because reception of data is possible. However, the power consumption is smaller than the power consumption in the normal mode.

In the case where switching the operation mode from the normal mode to the power saving mode, the mode switching portion 77 outputs a power saving switch signal, indicating that the operation mode has been switched to the power saving mode, to the stop prediction portion 61. In the case where switching the operation mode from the power saving mode to the normal mode, the mode switching portion 77 outputs a normal switch signal, indicating that the operation mode has been switched to the normal mode, to the activation portion 69.

In response to reception of the power saving switch signal from the mode switching portion 77, the stop prediction portion 61 notifies the emulate portion 55 of stopping of the HDD 115. Specifically, the stop prediction portion 61 outputs a stop prediction signal to the emulate portion 55.

The emulate portion 55 includes a stop response portion 81, an access destination conversion portion 83 and an activation response portion 85. In response to reception of the stop prediction signal from the stop prediction portion 61, on the condition that no access to the HDD 115 by the guest control portion 53 is present, the stop response portion 81 responds to the stop prediction signal. Specifically, in the case where the emulate portion 55 is controlled by the guest control portion 53 and not controlling the HDD 115 at a time point at which the stop prediction signal is received from the stop prediction portion 61, the stop response portion 81 outputs a response signal, corresponding to the stop prediction signal, to the transfer portion 63. In the case where the emulate portion 55 is controlled by the guest control portion 53 and controlling the HDD 115 at the time point at which the stop prediction signal is received from the stop prediction portion 61, the stop response portion 81 waits until the control of the HDD 115 by the guest control portion 53 ends. Then, in response to the end of the control of the HDD 115 by the guest control portion 53, the stop response portion 81 outputs a response signal, corresponding to the stop prediction signal, to the transfer portion 63.

In response to reception of the response signal corresponding to the stop prediction signal from the stop response portion 81, the transfer portion 63 stores the data, stored in a predetermined region of the HDD 115, in an image region of the RAM 114. The predetermined region of the HDD 115 can be one or more predetermined partitions among a plurality of partitions of the HDD 115. The transfer portion 63 reads out the data stored in the partition as the image data and stores the data in the image region of the RAM 114. In response to completion of the storage of the data, stored in the HDD 115, in the RAM 114, the transfer portion 63 outputs a transfer completion signal to each of the stop portion 67 and the transfer completion notification portion 65.

In response to reception of the transfer completion signal from the transfer portion 63, the stop portion 67 stops the HDD 115. Specifically, the stop portion 67 controls the host control portion 51 and cuts off the power supplied to the HDD 115. In response to reception of the transfer completion signal from the transfer portion 63, the transfer completion notification portion 65 outputs a transfer completion signal to the access destination conversion portion 83 of the emulate portion 55.

In response to reception of the transfer completion signal from the transfer completion notification portion 65, the access destination conversion portion 83 converts the access to the HDD 115 by the guest control portion 53 into the access to the image region of the RAM 114. Specifically, the access destination conversion portion 83 converts the access to the HDD 115 by the guest control portion 53 into the access to the image region of the RAM 114 by emulating the control of the HDD 115. Thus, with the HDD 115 stopped, the guest control portion 53 can control the HDD 115. The control of the HDD 115 by the guest control portion 53 is switched to the control, of the RAM 114 by the host control portion 51, by the access destination conversion portion 83, so that the guest control portion 53 can perform the same control as the control performed in the case where the guest control portion 53 controls the HDD 115.

In response to reception of a normal switch signal from the mode switching portion 77, the activation portion 69 activates the HDD 115. Specifically, the activation portion 69 controls the host control portion 51 and supplies the power to the HDD 115. When the HDD 115 is activated, the activation portion 69 outputs an activation start signal to the activation start notification portion 71. In response to reception of the activation start signal from the activation portion 69, the activation start notification portion 71 outputs an activation start signal to the activation response portion 85 of the emulate portion 55.

In response to reception of the activation start signal from the activation start notification portion 71, on the condition that no access to the HDD 115 by the guest control portion 53 is present, the activation response portion 85 responds to the activation start signal. Specifically, in the case where the emulate portion 55 is controlled by the guest control portion 53 and not controlling the HDD 115 at a time point at which the activation start signal is received from the activation start notification portion 71, the activation response portion 85 outputs a response signal corresponding to the activation start signal to the data recovery portion 73. In the case where the emulate portion 55 is controlled by the guest control portion 53 and is controlling the HDD 115 at the time point at which the activation start signal is received from the activation start notification portion 71, the activation response portion 85 waits until the control of the HDD 115 by the guest control portion 53 ends. Then, in response to the end of the control of the HDD 115 by the guest control portion 53, the activation response portion 85 outputs a response signal corresponding to the activation start signal to the data recovery portion 73.

At a time point at which the activation start signal is received from the activation start notification portion 71, the access to the HDD 115 by the guest control portion 53 is converted by the access destination conversion portion 83 into the access to the image region of the RAM 114. Therefore, in response to the reception of the activation start signal from the activation start notification portion 71, on the condition that no access to the image region of the RAM 114 is present, the activation response portion 85 may respond to the activation start signal.

In response to reception of the response signal corresponding to the activation start signal from the activation response portion 85, the data recovery portion 73 stores the data, stored in the image region of the RAM 114, in a predetermined region of the HDD 115. The data recovery portion 73 stores the data, stored in the image region of the RAM 114, in the predetermined region of the HDD 115 as image data. In response to completion of the storage of the data, stored in the image region of the RAM 114, in the HDD 115, the data recovery portion 73 outputs a recovery completion signal to the activation completion notification portion 75.

In response to reception of the recovery completion signal from the data recovery portion 73, the activation completion notification portion 75 outputs a recovery completion signal to the access destination conversion portion 83 of the emulate portion 55.

In response to reception of the recovery completion signal from the activation completion notification portion 75, the access destination conversion portion 83 does not convert the access to the HDD 115 by the guest control portion 53 into the access to the image region of the RAM 114. Specifically, the access destination conversion portion 83 does not emulate the control of the HDD 115. Thus, the guest control portion 53 can control the HDD 115.

Figure 4:
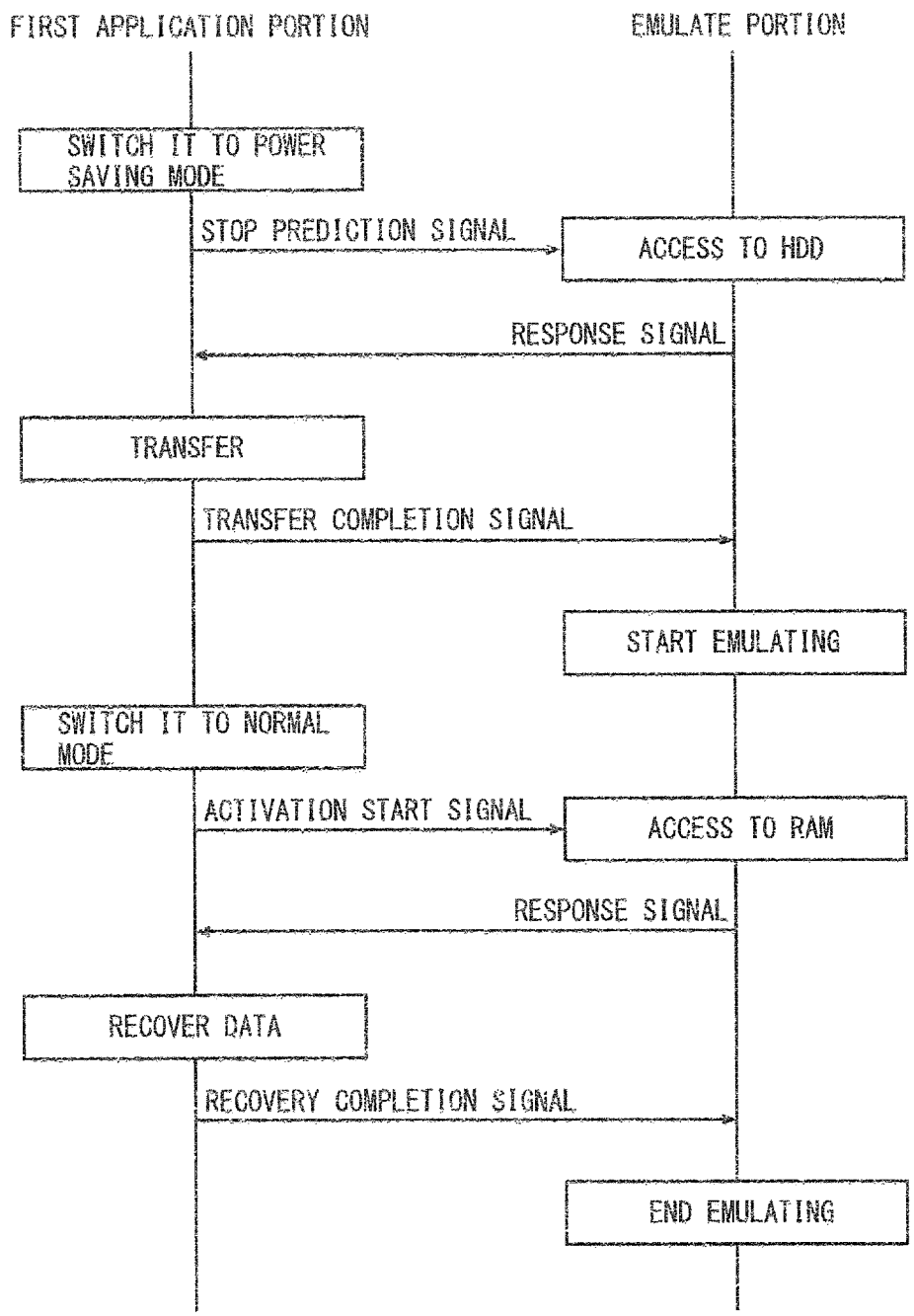
FIG. 4 is a diagram showing one example of a flow of data.

FIG. 4 is a diagram showing one example of a flow of data. In FIG. 4, a time flow is shown from the top to the bottom in a chronological order. Referring to FIG. 4, in the case where switching the operation mode to the power saving mode, the first application portion 57 outputs a stop prediction signal to the emulate portion 55. In the case where accessing the HDD 115 at a time point at which receiving the stop prediction signal, the emulate portion 55 waits until the access to the HDD 115 ends. In response to the end of the access to the HDD 115, the emulate portion 55 outputs a response signal to the first application portion 57.

The first application portion 57 waits until the response signal corresponding to the stop prediction signal is received. In response to reception of the response signal, the first application portion 57 transfers the data by storing the data, stored in the HDD 115, in the image region of the RAM 114. In response to completion of the transfer of the data stored in the HDD 115 to the RAM 114, the first application portion 57 outputs a transfer completion signal to the emulate portion 55. In response to reception of the transfer completion signal, the emulate portion 55 starts emulating the control of the HDD 115, and converts the access to the HDD 115 into the access to the image region of the RAM 114. Further, the emulate portion 55 suspends the control of the HDD 115 from the time when outputting a response signal corresponding to the stop prediction signal until the time when receiving the transfer completion signal.

After switching the operation mode to the power saving mode, the first application portion 57 does not store the data, stored in the predetermined region of the HDD 115, in the image region of the RAM 114 until receiving the response signal corresponding to the stop prediction signal from the emulate portion 55. In other words, during a time period in which the HDD 115 is controlled by the guest control portion 53, the first application portion 57 does not store the data, stored in the predetermined region of the HDD 115, in the image region of the RAM 114. Therefore, the changed data, which is created in the case where the data stored in the HDD 115 is changed by the emulate portion 55, can be stored in the image region of the RAM 114. Thus, the data stored in the image region of the RAM 114 and the data stored in the HDD 115 are the same at time points at which the first application portion 57 starts and ends storing the data, stored in the HDD 115, in the image region of the RAM 114, so that the same data as the data stored in the HDD 115 can be stored in the RAM 114.

In the case where switching the operation mode to the normal mode, the first application portion 57 activates the HDD 115 and then outputs an activation start signal to the emulate portion 55. In the case where accessing the image region of the RAM 114 at a time point at which receiving the activation start signal, the emulate portion 55 waits until the access to the RAM 114 ends. In response to the end of the access to the RAM 114, the emulate portion 55 outputs a response signal to the first application portion 57.

The first application portion 57 waits until receiving the response signal corresponding to the activation start signal. In response to the reception of the response signal, the first application portion 57 recovers the data by storing the data, stored in the image region of the RAM 114, in the HDD 115. In response to completion of the transfer of the data stored in the image region of the RAM 114 to the HDD 115, the first application portion 57 outputs a recovery completion signal to the emulate portion 55. In response to reception of the recovery completion signal, the emulate portion 55 ends emulating the control of the HDD 115. Further, the emulate portion 55 suspends the control of the RAM 114 from the time when outputting the response signal corresponding to the activation start signal until the time when receiving the recovery completion signal.

After switching the operation mode to the normal mode, the first application portion 57 does not store the data, stored in the image region of the RAM 114, in the predetermined region of the HDD 115 until receiving the response signal corresponding to the activation start signal from the emulate portion 55. In other words, during a time period in which the HDD 115 is controlled by the guest control portion 53, the first application portion 57 does not store the data, stored in the image region of the RAM 114, in the predetermined region of the HDD 115. Therefore, the changed data, which is created in the case where the data stored in the image region of the RAM 114 is changed by the guest control portion 53, can be stored in the predetermined region of the HDD 115. Thus, the data stored in the image region of the RAM 114 and the data stored in the HDD 115 are the same at time points at which the first application portion 57 starts and ends storing the data, stored in the image region of the RAM 114, in the HDD 115, so that the same data as the data stored in image region of the RAM 114 can be stored in the predetermined region of the HDD 115.

Figure 5:
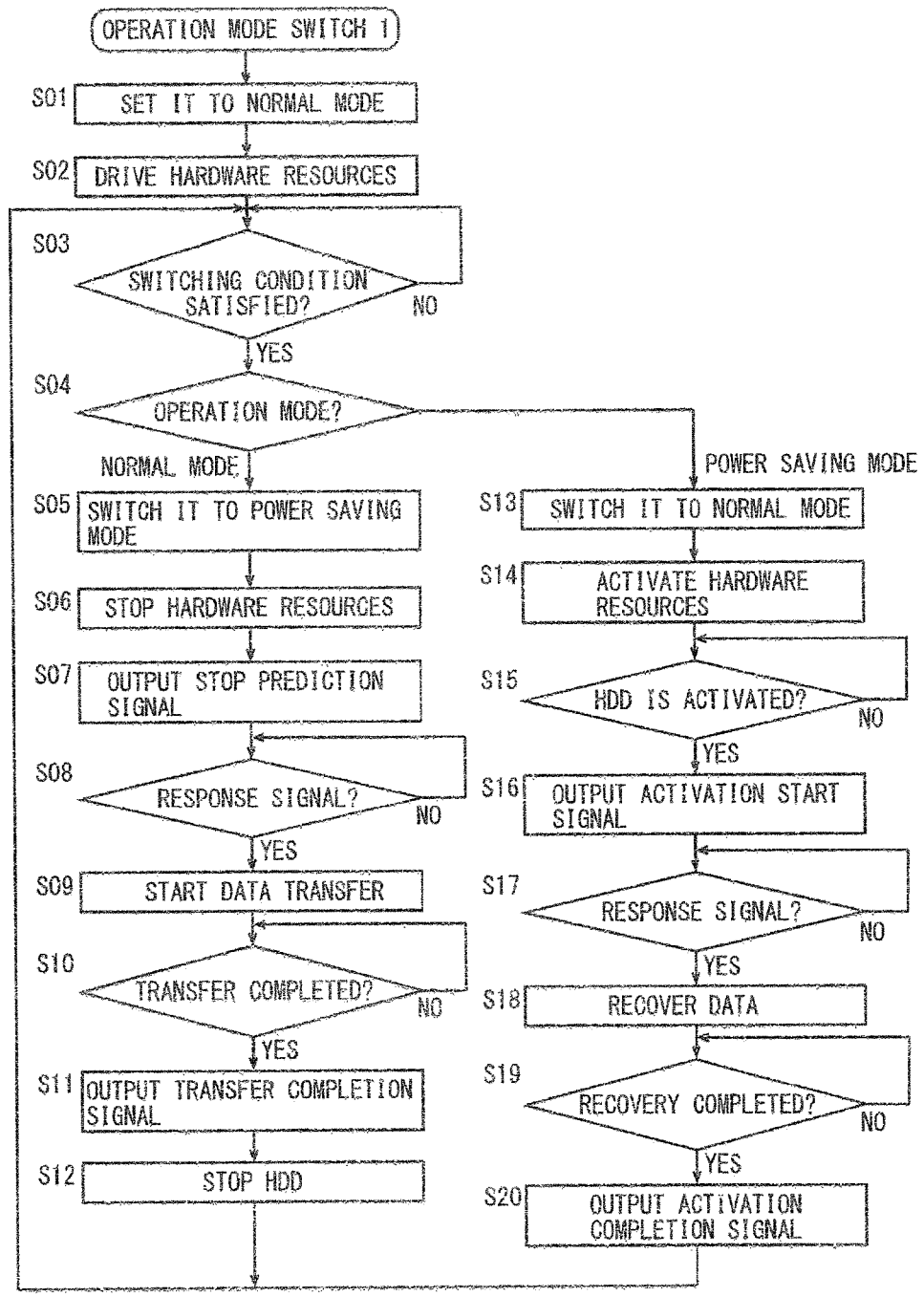
FIG. 5 is a flow chart showing one example of a flow of an operation mode switching process.

FIG. 5 is a flow chart showing one example of a flow of an operation mode switching process. The operation mode switching process is a process executed by the CPU 111 in the case where the CPU 111 executes an operation mode switching program stored in the ROM 113, the HDD 115 or the CD-ROM 118. The operation mode switching program is part of a mode switching program and part of the first application program. Referring to FIG. 5, the CPU 111 sets the operation mode to the normal mode (step S01). For example, at a time point at which being activated, the CPU 111 sets the operation mode to the normal mode. In the next step S02, the hardware resources are driven, and the process proceeds to the step S03.

In the step S03, whether a switching condition for switching the operation modes is satisfied is determined. The process waits until the switching condition for switching the operation modes is satisfied (NO in the step S03). If the switching condition is satisfied (YES in the step S03), the process proceeds to the step S04. The switching condition for switching the operation modes includes a switching condition for switching the operation mode from the normal mode to the power saving mode and a switching condition for switching the operation mode from the power saving mode to the normal mode. The switching condition for switching the operation mode to the power saving mode is applied in the case where, for example, the below-mentioned state continues for a predetermined time period with the operation mode switched to the normal mode, the state being a state where the operation unit 163 does not accept an operation by the user, the communication I/F unit 112 does not receive a print job, and the facsimile unit 116 does not receive facsimile data. The switching condition for switching the operation mode to the normal mode is applied to the case where, for example, with the operation mode switched to the power saving mode, the operation unit 163 accepts an operation by the user, the communication I/F unit 112 receives a print job, or the facsimile unit 116 receives facsimile data.

In the step S04, the process branches depending on an operation mode that is set at that time point. If the operation mode is set to the normal mode, the process proceeds to the step S05. If the operation mode is set to the power saving mode, the process proceeds to the step S13.

In the step S05, the CPU 111 switches the operation mode to the power saving mode, and the process proceeds to the step S06. In the step S06, the hardware resources except for the RAM 114 and the HDD 115 are stopped, and the process proceeds to the step S07. Thus, the power consumed by the hardware resources except for the RAM 114 and the HDD 115 is reduced. In the step S07, a stop prediction signal is output to the emulate portion 55 formed by the execution of the emulate program, and the process proceeds to the step S08. In the step S08, the process waits until a response signal corresponding to the stop prediction signal is received from the task formed by the execution of the emulate program (NO in the step S08). If the response signal is received (YES in the step S08), the process proceeds to the step S09.

In the step S09, the CPU 111 starts transferring data. The CPU 111 starts a process of storing the data, stored in the predetermined region of the HDD 115, in the image region of the RAM 114 as image data. In the next step S10, whether the process of transferring the data has been completed is determined. The process waits until the process of transferring the data is completed (NO in the step S10). If the process is completed (YES in the step S10), the process proceeds to the step S11. In the step S11, a transfer completion signal is output to the emulate portion 55 formed by the execution of the emulate program, and the process proceeds to the step S12. In the step S12, the HDD 115 is stopped, and the process returns to the step S03.

In the step S13, the CPU 111 switches the operation mode to the normal mode, and the process proceeds to the step S14. In the step S14, the hardware resources except for the RAM 114 are activated, and the process proceeds to the step S15. In the step S15, the process waits until the HDD 115 is activated (NO in the step S15). If the HDD 115 is activated (YES in the step S15), the process proceeds to the step S16.

The state where the HDD 115 is activated is the state where the data can be written into or read from the HDD 115. In the step S16, an activation start signal is output to the emulate portion 55 that is a task formed by the execution of the emulate program, and the process proceeds to the step S17. In the step S17, the process waits until a response signal corresponding to the activation start signal is received from the task formed by the execution of the emulate program (NO in the step S17). If the response signal is received (YES in the step S17), the process proceeds to the step S18.

In the step S18, the CPU 111 starts recovering data. The CPU 111 starts a process of storing the data, stored in the image region of the RAM 114, in the predetermined region in the HDD 115 as image data. In the next step S19, whether the process of recovering the data has been completed is determined. The process waits until the process of recovering the data is completed (NO in the step S19). If the process is completed (YES in the step S19), the process proceeds to the step S20. In the step S20, an activation completion signal is output to the emulate portion 55 that is a task formed by the execution of the emulate program, and the process returns to the step S03.

Figure 6:
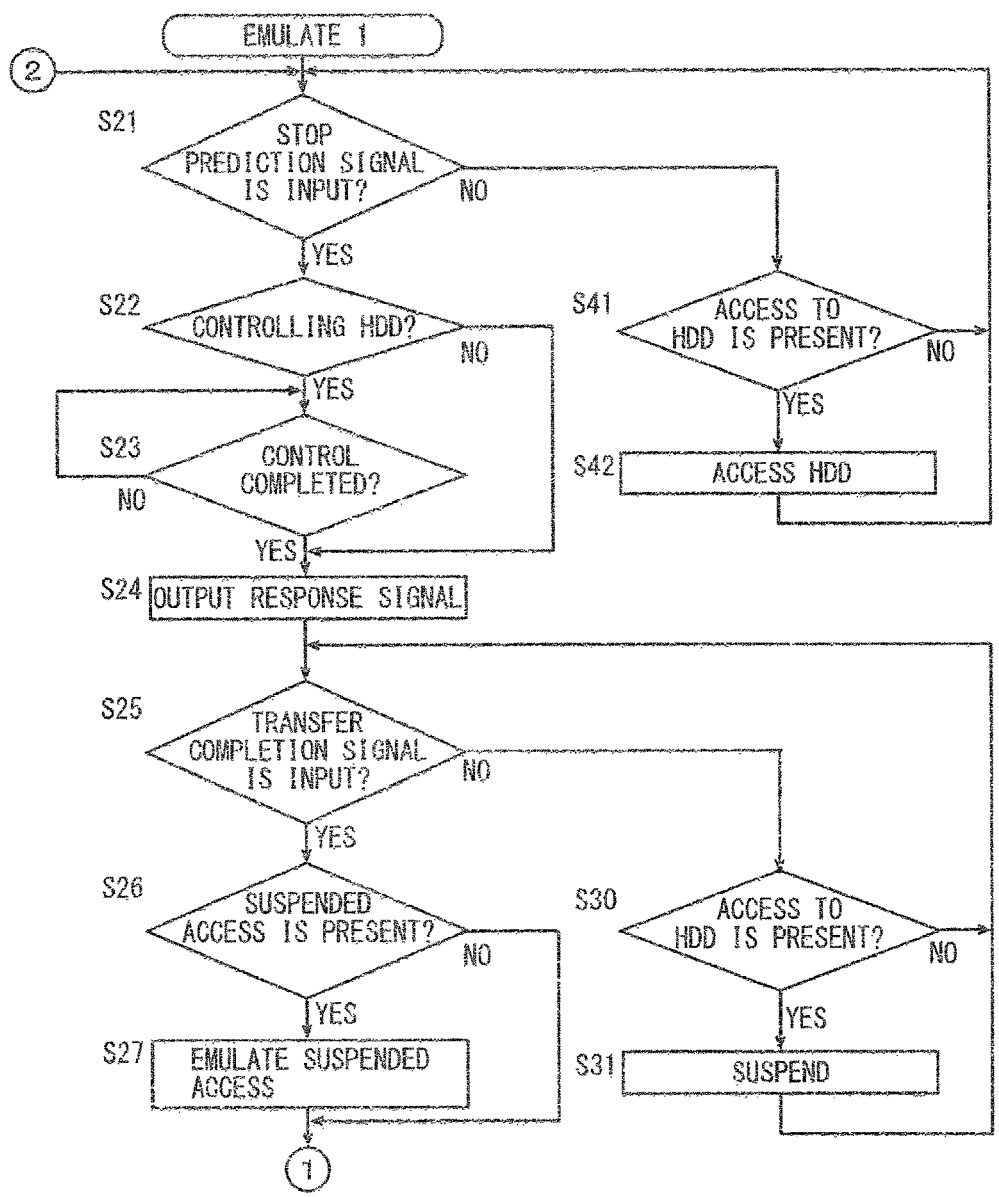
FIG. 6 is a first flow chart showing one example of a flow of an emulate process.
Figure 7:
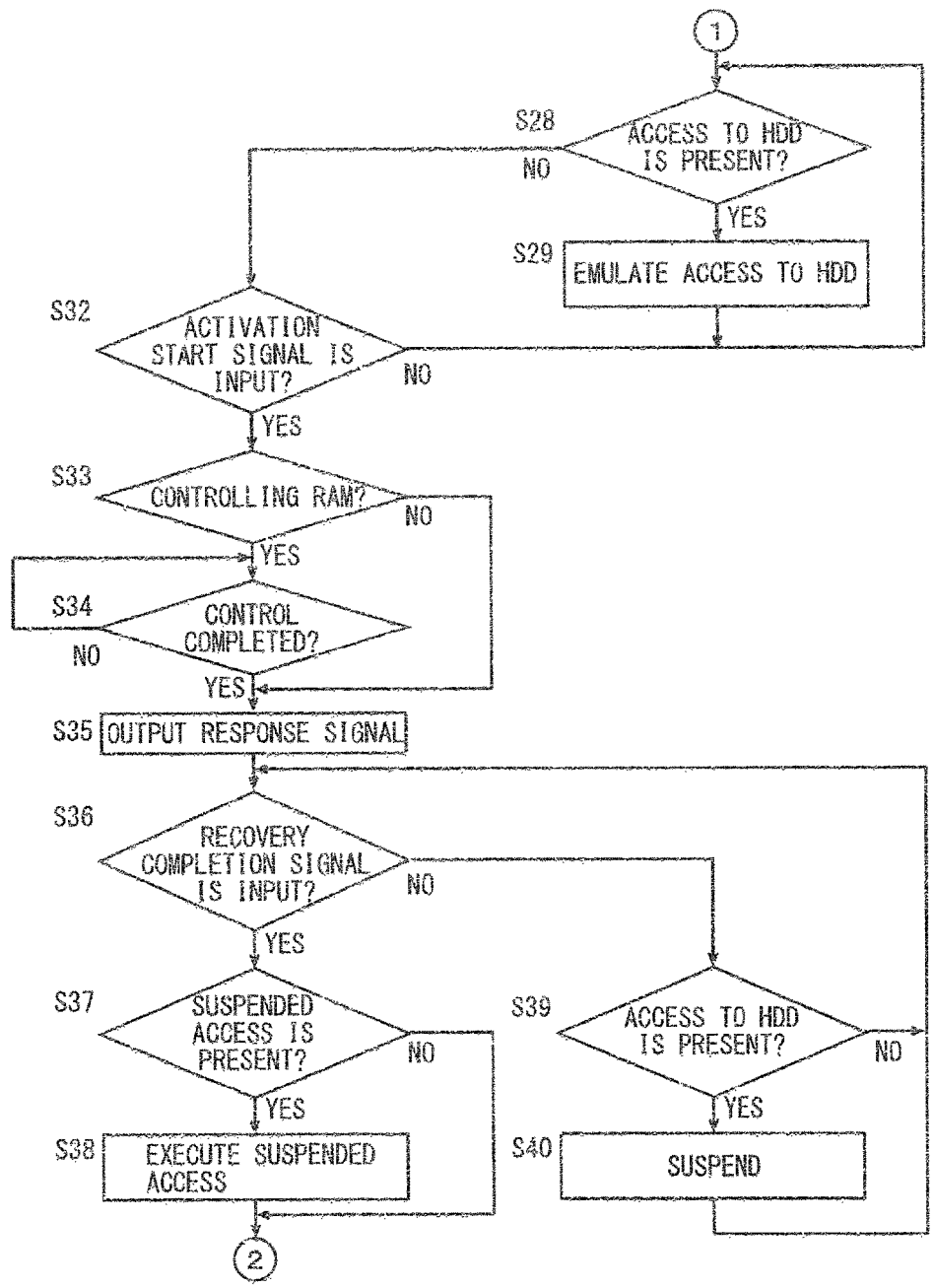
FIG. 7 is a second flow chart showing the one example of the flow of the emulate process.

FIGS. 6 and 7 are flow charts showing one example of a flow of an emulate process. The emulate process is a process executed by the CPU 111 in the case where the CPU 111 executes the emulate program stored in the RAM 113, the HDD 115 or the CD-ROM 118. The emulate program is part of the mode switching program. Referring to FIGS. 6 and 7, the CPU 111 determines whether a stop prediction signal has been received from a task formed by the execution of the operation mode switching program (step S21). If the stop prediction signal is received, the process proceeds to the step S22. If not, the process proceeds to the step S41. In the step S41, whether the access to the HDD 115 is present is determined. In the case where a system call for controlling the HDD 115 is received from a task formed when the CPU 111 executes the second operating system program, the CPU 111 detects the access to the HDD 115. If the CPU 111 detects the access to the HDD 115, the process proceeds to the step S42. If not, the process returns to the step S21. In the step S42, the CPU 111 accesses the HDD 115, and the process returns to the step S21. Specifically, a system call for controlling the HDD 115 is output to a task formed in the case where the CPU 111 executes the first operating system program.

In the step S22, the CPU 111 determines whether the CPU 111 is controlling the HDD 115. If the CPU 111 is controlling the HDD 115, the process proceeds to the step S23. If not, the process proceeds to the step S24. In the step S23, the process waits until the control of the HDD 115 is completed (NO in the step S23). If the control of the HDD 115 is completed (YES in the step S23), the process proceeds to the step S24. In the step S24, a response signal is output to a task formed in the case where the CPU 111 executes the operation mode switching program, and the process proceeds to the step S25.

In the step S25, the CPU 111 determines whether a transfer completion signal has been received from the task formed by the execution of the operation mode switching program. If the transfer completion signal is received, the process proceeds to the step S26. If not, the process proceeds to the step S30. In the step S30, the CPU 111 determines whether the access to the HDD 115 is present. In the case where a system call for controlling the HDD 115 is received from a task formed when the CPU 111 executes the second operating system program, the CPU 111 detects the access to the HDD 115. If the access to the HDD 115 is detected, the process proceeds to the step S31. If not, the process returns to the step S25. In the step S31, the CPU 111 suspends the access to the HDD 115, and the process returns to the step S25. Specifically, the system call, received from the task formed in the case where the CPU 111 executes the second operating system program, is suspended.

In the step S26, the CPU 111 determines whether the suspended access to the HDD 115 is present. If the access to the HDD 115 is suspended in the step S31, the process proceeds to the step S27. If not, the process proceeds to the step S28. In the step S27, the suspended access to the HDD 115 is emulated, and the CPU 111 accesses the image region of the RAM 114. Then, the process proceeds to the step S28.

In the step S28, the CPU 111 determines whether the access to the HDD 115 is present. In the case where a system call for controlling the HDD 115 is received from a task formed when the CPU 111 executes the second operating system program, the CPU 111 detects the access to the HDD 115. If the access to the HDD 115 is detected, the process proceeds to the step S29. If not, the process proceeds to the step S32. In the step S29, the access to the HDD 115 is emulated, and the CPU 111 accesses to the image region of the RAM 114. Then, the process returns to the step S28.

In the step S32, the CPU 111 determines whether an activation start signal has been received from a task formed by the execution of the operation mode switching program. If the activation start signal is received, the process proceeds to the step S33. If not, the process returns to the step S28. In the step S33, whether the CPU 111 is controlling the RAM 114 is determined. If the CPU 111 is controlling the RAM 114, the process proceeds to the step S34. If not, the process proceeds to the step S35. In the step S34, the process waits until the control of the RAM 114 is completed (NO in the step S34). If the control of the RAM 114 is completed (YES in the step S34), the process proceeds to the step S35.

In the step S35, a response signal is output to the task formed in the case where the CPU 111 executes the operation mode switching program, and the process proceeds to the step S36. In the step S36, the CPU 111 determines whether a recovery completion signal has been received from the task formed by the execution of the operation mode switching program. If the recovery completion signal is received, the process proceeds to the step S37. If not, the process proceeds to the step S39. In the step S39, the CPU 111 determines whether the access to the HDD 115 is present. In the case where a system call for controlling the HDD 115 is received from a task formed in the case where the CPU 111 executes the second operating system program, the CPU 111 detects the access to the HDD 115. If the access to the HDD 115 is detected, the process proceeds to the step S40. If not, the process returns to the step S36. In the step S40, the CPU 111 suspends the access to the HDD 115, and the process returns to the step S38.

In the step S37, the CPU 111 determines whether the suspended access to the HDD 115 is present. If the access to the HDD 115 is suspended in the step S40, the process proceeds to the step S38. If not, the process returns to the step S21. In the step S38, the CPU 111 carries out the suspended access to the HDD 115, and the process returns to the step S21.

Modified Example

In the MFP 100 of one or more embodiments described above, the task, which is formed in the case where the CPU 111 executes the first application program, executes the process of storing the data, stored in the predetermined region of the HDD 115, in the image region of the RAM 114, and the first application portion 57 executes the process of storing the data, stored in the image region of the RAM 114, in the predetermined region of the HDD 115. In an MFP 100 in the modified example, a task, which is formed in the case where the CPU 111 executes an emulate program, is allowed to execute the process of storing the data, stored in the predetermined region of the HDD 115, in the image region of the RAM 114, and the process, of storing the data stored in the image region of the RAM 114 in the predetermined region of the HDD 115. Differences from the MFP 100 in one or more embodiments as described above will be mainly described below.

Figure 8:
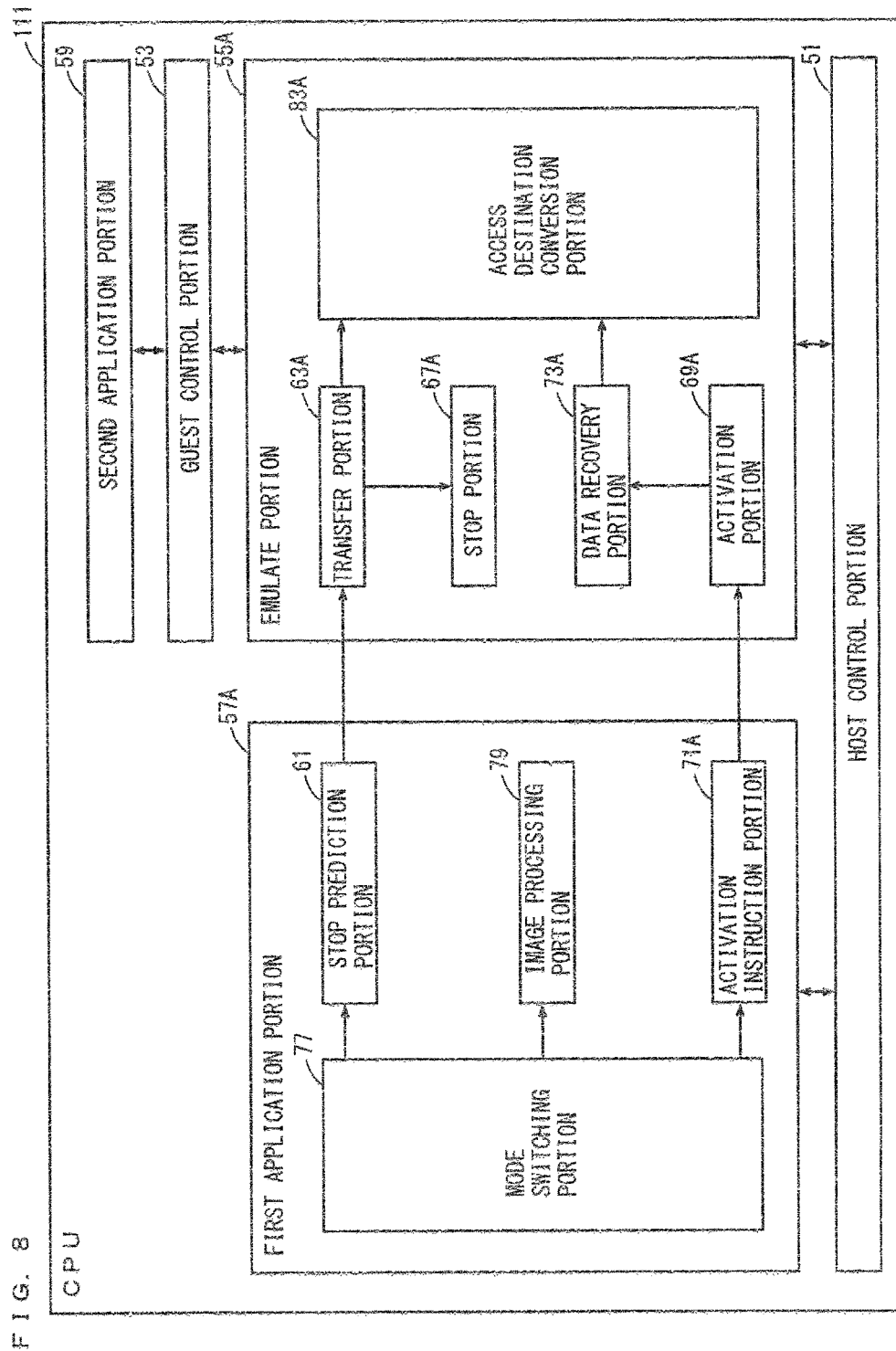
FIG. 8 is a diagram showing one example of functions of a CPU included in an MFP in a modified example.

FIG. 8 is a diagram showing one example of functions of a CPU included in the MFP in the modified example. Referring to FIG. 8, the functions of the CPU 111 included in the MFP 100 in the modified examples differ from the functions shown in FIG. 3 in that the first application portion 57 and the emulate portion 55 are respectively changed to a first application portion 57A and an emulate portion 55A. Further, the same functions as the functions shown in FIG. 3 are denoted with the same reference characters. Thus, a detailed description thereof will not be repeated.

The emulate portion 55A is a task formed in the case where the CPU 111 executes the emulate program in the modified example. The emulate program in the modified example is an application program compatible with the first operating system program. The emulate portion 55A is a virtual device for the guest control portion 53 and emulates the control of the hardware resources by the host control portion 51.

The first application portion 57A is a task formed in the case where the CPU 111 executes the first application program in the modified example compatible with the first operating system program. The first application portion 57A controls the host control portion 51, thereby being capable of controlling the hardware resources included in the MFP 100.

Each of the first application portion 57A and the emulate portion 55A can control the host control portion 51 and is managed by the host control portion 51. Thus, the first application portion 57A and the emulate portion 55A can identify each other, thereby being capable of communicating with each other by using the inter-process communication and the like.

The first application portion 57A includes the mode switching portion 77 that switches operation modes of the MFP 100, the stop prediction portion 61, the image processing portion 79 and an activation instruction portion 71A. In the case where switching the operation mode from the normal mode to the power saving mode, the mode switching portion 77 outputs a power saving switch signal, indicating that the operation mode has been switched to the power saving mode, to the stop prediction portion 61. In response to reception of a normal switch signal from the mode switching portion 77, the activation instruction portion 71A outputs an activation instruction signal that gives an instruction to activate the HDD 115 to the emulate portion 55A. In the case where switching the operation mode from the power saving mode to the normal mode, the mode switching portion 77 outputs a normal switch signal indicating that the operation mode has been switched to the normal mode to the activation instruction portion 71A. In response to reception of the normal switch signal from the mode switching portion 77, the activation instruction portion 71A outputs an activation instruction signal that gives an instruction to activate the HDD 115 to the emulate portion 55A.

The emulate portion 55A includes a transfer portion 63A, a stop portion 67A, an activation portion 69A, a data recovery portion 73A and an access destination conversion portion 83A. In response to reception of the stop prediction signal from the stop prediction portion 61, on the condition that no access to the HDD 115 by the guest control portion 53 is present, the transfer portion 63A stores the data, stored in the predetermined region of the HDD 115, in the image region of the RAM 114. Specifically, in the case where the emulate portion 55A is controlled by the guest control portion 53 and not controlling the HDD 115 at a time point at which the stop prediction signal is received from the stop prediction portion 61, the transfer portion 63A stores the data, stored in the predetermined region of the HDD 115, in the image region of the RAM 114. In the case where the emulate portion 55A is controlled by the guest control portion 53 and is controlling the HDD 115 at the time point at which the stop prediction signal is received from the stop prediction portion 61, the transfer portion 63A waits until the control of the HDD 115 by the guest control portion 53 ends. Then, in response to the end of the control of the HDD 115 by the guest control portion 53, the transfer portion 63A stores the data, stored in the predetermined region of the HDD 115, in the image region of the RAM 114. The predetermined region of the HDD 115 can be one or more predetermined partitions among the plurality of partitions of the HDD 115. The transfer portion 63A reads out the data stored in the partition as image data, and stores the data in the image region of the RAM 114. In response to completion of the storage of the data, stored in the HDD 115, in the RAM 114, the transfer portion 63A outputs a transfer completion signal to each of the stop portion 67A and the access destination conversion portion 83A.

In response to reception of the transfer completion signal from the transfer portion 63A, the stop portion 67A stops the HDD 115. Specifically, the stop portion 67A controls the host control portion 51 and cuts off the power supplied to the HDD 115.

After the operation mode is switched to the power saving mode, the transfer portion 63A does not store the data, stored in the predetermined region of the HDD 115, in the image region of the RAM 114 until the access to the HDD 115 by the guest control portion 53 is no longer present. In other words, during a period in which the HDD 115 is controlled by the guest control portion 53, the transfer portion 63A does not store the data, stored in the predetermined region of the HDD 115, in the image region of the RAM 114. Therefore, the changed data, which is created in the case where the data stored in the HDD 115 is changed by the guest control portion 53, can be stored in the image region of the RAM 114. Thus, the data stored in the image region of the RAM 114 and the data stored in the HDD 115 are the same at time points at which the transfer portion 63A starts and ends storing the data, stored in the HDD 115, in the RAM 114, so that the same data as the data stored in the HDD 115 can be stored in the RAM 114.

In response to reception of the transfer completion signal from the transfer portion 63A, the access destination conversion portion 83A converts the access to the HDD 115 by the guest control portion 53 into the access to the image region of the RAM 114. Specifically, the access destination conversion portion 83A converts the access to the HDD 115 by the guest control portion 53 into the access to the image region of the RAM 114 by emulating the control of the HDD 115. Thus, with the HDD 115 stopped, the guest control portion 53 can control the HDD 115. Because the control of the HDD 115 by the guest control portion 53 is switched by the access destination conversion portion 83A to the control of the RAM 114 by the host control portion 51, the guest control portion 53 can perform the same control as the control performed in the case where the guest control portion 53 controls the HDD 115.

In response to reception of the activation instruction signal from the activation instruction portion 71A, the activation portion 69A activates the HDD 115. Specifically, the activation portion 69A controls the host control portion 51 and supplies the power to the HDD 115. When the HDD 115 is activated, the activation portion 69A outputs an activation completion signal to the data recovery portion 73A.

In response to reception of the activation completion signal from the activation portion 69A, on the condition that no access to the HDD 115 by the guest control portion 53 is present, the data recovery portion 73A stores the data, stored in the image region of the RAM 114, in the predetermined region of the HDD 115. Specifically, in the case where the emulate portion 55A is controlled by the guest control portion 53 and not controlling the HDD 115 at a time point at which the activation completion signal is received from the activation portion 69A, the data recovery portion 73A stores the data, stored in the image region of the RAM 114, in the predetermined region of the HDD 115. In the case where the emulate portion 55A is controlled by the guest control portion 53 and controlling the HDD 115 at the time point at which the activation completion signal is received from the activation portion 69A, the data recovery portion 73A waits until the control of the HDD 115 by the guest control portion 53 ends. In response to the end of the control of the HDD 115 by the guest control portion 53, the data recovery portion 73A stores the data, stored in the image region of the RAM 114, in the predetermined region of the HDD 115. The data recovery portion 73A stores the data, stored in the image region of the RAM 114, in the predetermined region of the HDD 115 as image data. In response to completion of the storage, of the data stored in the image region of the RAM 114, in the HDD 115, the data recovery portion 73A outputs a recovery completion signal to the access destination conversion portion 83A.

After the operation mode is switched to the normal mode, the data recovery portion 73A does not store the data, stored in the image region of the RAM 114, in the predetermined region of the HDD 115 until the access to the HDD 115 by the guest control portion 53 is no longer present. In other words, during a period in which the HDD 115 is controlled by the guest control portion 53, the data recovery portion 73A does not store the data, stored in the image region of the RAM 114, in the predetermined region of the HDD 115. Therefore, the changed data, which is created in the case where the data stored in the image region of the RAM 114 is changed by the guest control portion 53, can be stored in the predetermined region of the HDD 115. Thus, the data stored in the image region of the RAM 114 and the data stored in the HDD 115 are the same at time points at which the data recovery portion 73A starts and ends storing the data, stored in the image region of the RAM 114, in the HDD 115, so that the same data as the data stored in the image region of the RAM 114 can be stored in the predetermined region of the HDD 115.

At a time point at which the activation completion signal is received from the activation portion 69A, the access to the HDD 115 by the guest control portion 53 is switched by the access destination conversion portion 83A to the access to the image region of the RAM 114. Therefore, in response to reception of the activation completion signal from the activation portion 69A, on the condition that no access to the image region of the RAM 114 is present, the data recovery portion 73A stores the data, stored in the image region of the RAM 114, in the predetermined region of the HDD 115.

In response to reception of the recovery completion signal from the data recovery portion 73A, the access destination conversion portion 83A does not convert the access to the HDD 115 by the guest control portion 53 into the access to the image region of the RAM 114. Specifically, the access destination conversion portion 83A does not emulate the control of the HDD 115. Thus, the guest control portion 53 can control the HDD 115.

Figure 9:
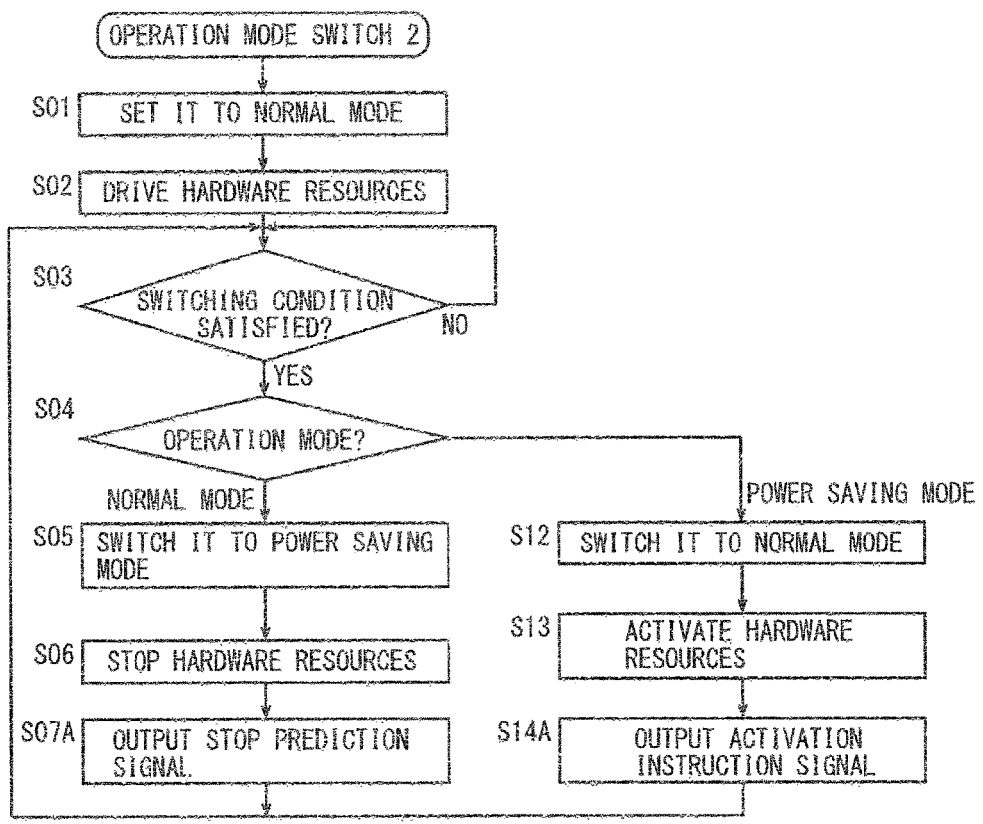
FIG. 9 is a flow chart showing one example of an operation mode switching process in the modified example.

FIG. 9 is a flow chart showing one example of a flow of an operation mode switching process in the modified example. The operation mode switching process in the modified example is a process executed by the CPU 111 in the case where the CPU 111 executes an operation mode switching program stored in the ROM 113, the HDD 115 or the CD-ROM 118. The operation mode switching program in the modified example is part of a mode switching program in the modified example, and part of a first application program. Referring to FIG. 9, differences from the operation mode switching process shown in FIG. 5 are that the steps S08 to S11 and the steps S15 to S19 are deleted, and that the step S07 and the step S14 are respectively changed to the step S07A and the step S14A. The other process is the same as the process shown in FIG. 5. Therefore, a description thereof will not be repeated.

In the step S07A, the CPU 111 outputs a transfer prediction signal to the emulate portion 55 that is a task formed by the execution of the emulate program, and the process returns to the step S03. In the step S14A, the CPU 111 outputs an activation instruction signal to the emulate portion 55 that is the task formed by the execution of the emulate program, and the process returns to the step S03.

Figure 10:
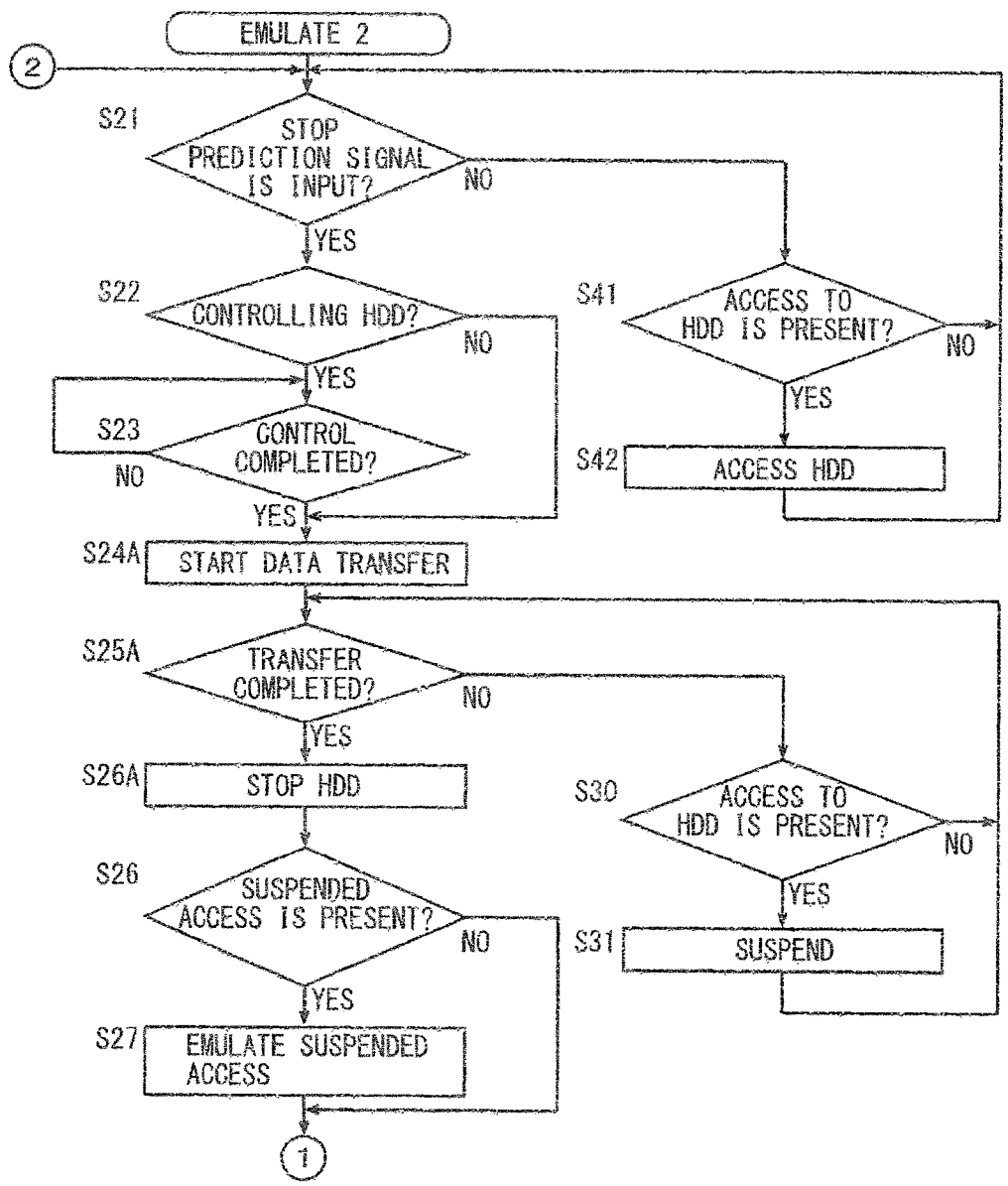
FIG. 10 is a first flow chart showing one example of a flow of an emulate process in the modified example.
Figure 11:
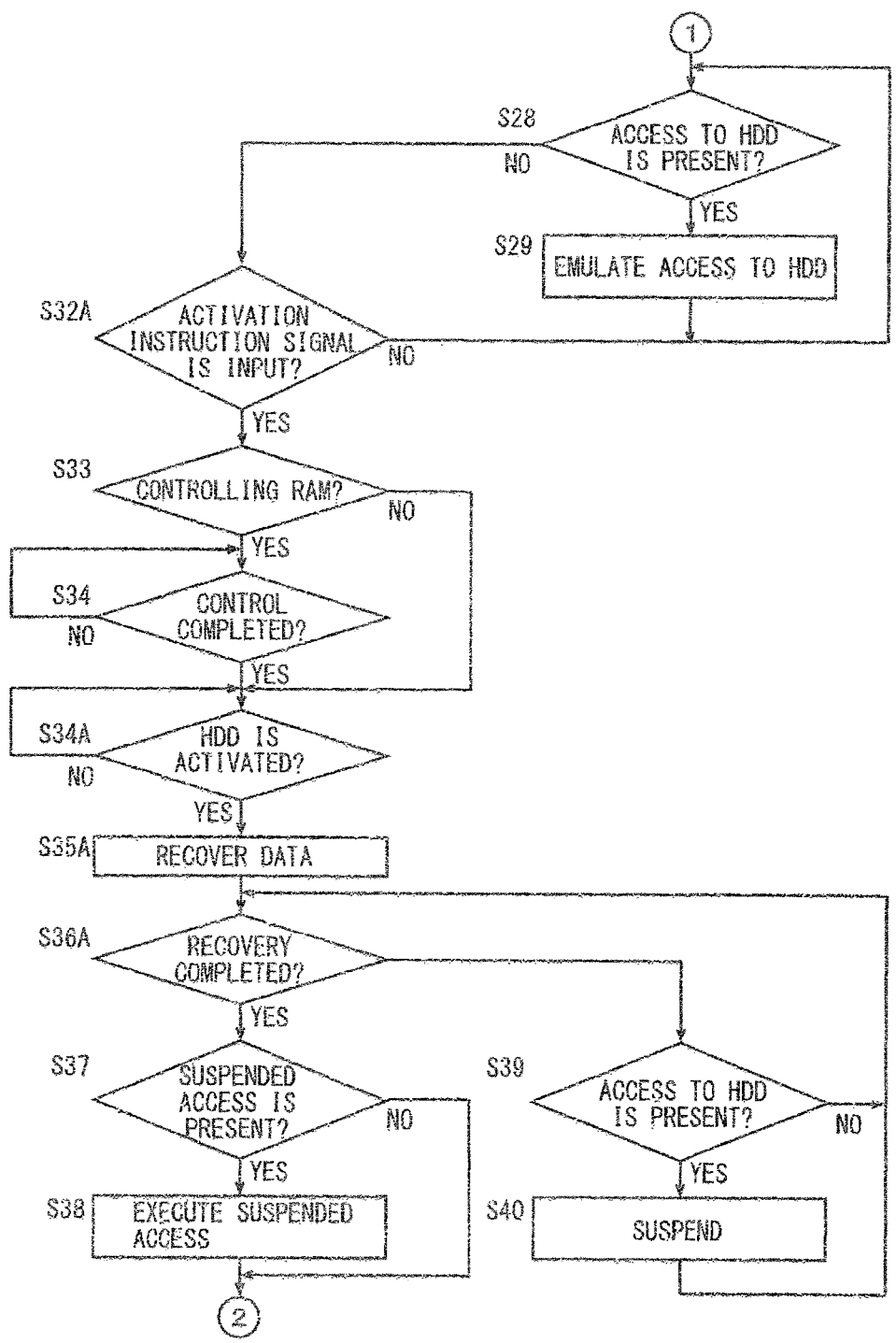
FIG. 11 is a second flow chart showing the one example of the flow of the emulate process in the modified example.

FIGS. 10 and 11 are flow charts showing one example of a flow of an emulate process in the modified example. The emulate process in the modified example is a process executed by the CPU 111 in the case where the CPU 111 executes the emulate program in the modified example stored in the ROM 113, the HDD 115 or the CD-ROM 118. The emulate program in the modified example is part of a mode switching program in the modified example. Referring to FIGS. 10 and 11, differences from the process shown in FIGS. 6 and 7 are that the step S24, the step S25, the step S32, the step S35 and the step S36 are respectively changed to the step S24A, the step S25A, the step S32A, the step S35A and the step S36A, and that the step S24A and the step S34A are added. The other process is the same as the process shown in FIGS. 6 and 7. Therefore, a description thereof will not be repeated.

The case where the process proceeds to the step S24A is the case where it is determined in the step S22 that the CPU 111 is not controlling the HDD 115 at a time point at which a stop prediction signal is received in the step S21. Alternatively, the case where the process proceeds to the step S24A is the case where it is determined in the step S22 that the CPU 111 is controlling the HDD 115 at the time point at which the stop prediction signal is received in the step S21, and also it is determined in the step S23 that the control of the HDD 115 is completed. In the step S24A, the CPU 111 starts transferring data. The CPU 111 starts a process of storing the data, stored in the predetermined region of the HDD 115, in the image region of the RAM 114 as image data. In the next step S25A, whether the process of transferring the data has been completed is determined. If the process of transferring the data is completed, the process proceeds to the step S26A. If not, the process proceeds to the step S30. In the step S26A, the CPU 111 stops the HDD 115, and the process proceeds to the step S26.

The case where the process proceeds to the step S32A is the case where the operation mode is switched to the power saving mode. In the step S32A, the CPU 111 determines whether an activation instruction signal has been received from a task formed by the execution of the operation mode switching program. If the activation instruction signal is received, the process proceeds to the step S33. If not, the process returns to the step S28.

The case where the process proceeds to the step S34A is the case where the CPU 111 is not controlling the RAM 114 at a time point at which the activation instruction signal is received from the task formed by the execution of the operation mode switching program in the step S32A. Alternatively, the case where the process proceeds to the step S34A is the case where it is determined in the step S33 that the CPU 111 is controlling the RAM 114 at the time point at which the activation instruction signal is received from the task formed by the execution of the operation mode switching program in the step 32A, and also it is determined in the step S34 that the control of the RAM 114 is completed. In the step S34A, the process waits until the HDD 115 is activated (NO in the step S34A). If the HDD 115 is activated (YES In the step S34A), the process proceeds to the step S35A.

In the step S35A, the CPU 111 starts recovering the data. The CPU 111 starts a process of storing the data, stored in the image region of the RAM 114, in the predetermined region of the HDD 115 as image data. In the next step S36A, the CPU 111 determines whether the process of recovering the data has been completed. If the process of recovering the data is completed (YES in the step S36A), the process proceeds to the step S37. If not (NO in the step S36A), the process proceeds to the step S39.

As described above, the MFP 100 of one or more embodiments includes the volatile RAM 114, the non-volatile HDD 115 and the CPU 111, and the CPU 111 executes the first operating system program, the second operating system program, the emulate program, the first application program and the second application program. Before the task formed by the execution of the first application program switches the operation mode to the power saving mode and stops the HDD 115, a host operating system that executes the first application program stores the data, stored in the predetermined partition of the HDD 115, in the image region of the RAM 114. Further, before the task formed by the execution of the first application program switches the operation mode to the power saving mode and stops the HDD 115, the MFP 110 in the modified example stores the data, stored in the predetermined partition of the HDD 115, in the image region of the RAM 114.

Then, after the HDD 115 is stopped by the task formed by the execution of the first application program, the task formed by the execution of the emulate program converts the access to the HDD 115 by a guest operation system that executes the second operating system program into the access to the image region of the RAM 114. Therefore, even after the HDD 115 is stopped, the second operating system can access the data that had been stored in the HDD 115. In other words, in the power saving mode, the power consumed by the HDD 115 is reduced, and the CPU 111 switches the access to the HDD 115 by the task formed by the execution of the second application program to the access to the RAM 114. Thus, the task formed by the execution of the second application program can access the data stored in the HDD 115.

Further, in the case where activating the HDD 115 being stopped, the task formed by the execution of the first application program stores the data, stored in the image region of the RAM 114, in the predetermined partition of the HDD 115. In the MFP 100 in the modified example, when the task formed by the execution of the emulate program activates the HDD 115 being stopped, the task formed by the execution of the emulate program stores the data, stored in the image region of the RAM 114, in the predetermined partition of the HDD 115.

Then, after the HDD 115 is activated by the task formed by the execution of the first application program, the task formed by the execution of the emulate program does not convert the access to the HDD 115 by the task formed by the execution of the second operating system program into the access to the image region of the RAM 114. Therefore, the changed data, which is created in the case where the data is changed in the RAM 114 during a period in which the HDD 115 is stopped, can be stored in the HDD 115.

The image region of the RAM 114 is a region used when the task formed by the execution of the first application program processes the image data, and the task formed by the execution of the first application program does not process the image data in the power saving mode. Thus, the image region of the RAM 114 can be effectively utilized in the power saving mode.

The MFP 100 in one or more embodiments described above shows the case where the second operating system program, which cannot be changed by the user of the MFP 100, is installed as the example. In the MFP 100 in one or more embodiments described below, a second operating system program, which can be changed by the user of the MFP 100, is installed. The appearance of the MFP 100 is the same as the perspective view shown in FIG. 1. The outline of the hardware configurations of the MFP 100 is the same as the block diagram shown in FIG. 2. Therefore, a description thereof will not be repeated.

Figure 12:
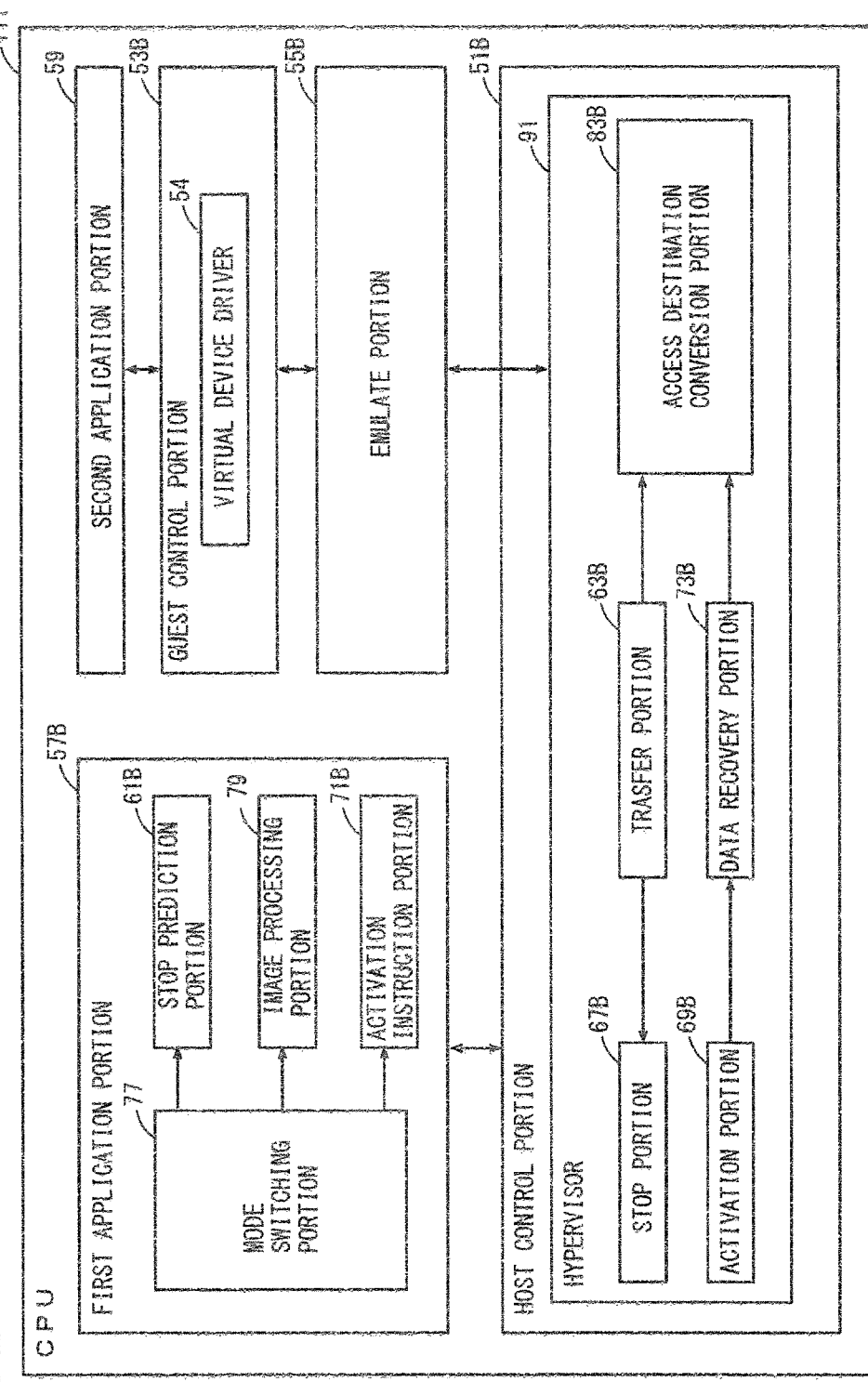
FIG. 12 is a diagram showing one example of functions of a CPU included in an MFP in accordance with one or more embodiments.

FIG. 12 is a diagram showing one example of functions of a CPU included in an MFP 100 in accordance with one or more embodiments. The same functions as the functions shown in FIG. 3 are denoted with the same reference characters. A description thereof will not be repeated. Referring to FIG. 12, the CPU 111 included in the MFP 100 of one or more embodiments includes a host control portion 51B, a guest control portion 53B, an emulate portion 55B, a first application portion 57B and a second application portion 59.

The host control portion 51B is a task formed in the case where the CPU 111 executes a first operating system program. The host control portion 51B controls the hardware resources included in the MFP 100.

The guest control portion 53B is a task formed in the case where the CPU 111 executes a second operating system program. The second operating system program is different from the first operating system program. The guest control portion 53B includes a virtual device driver 54. The virtual device driver 54 is compatible with the host control portion 51B and outputs a system call to the host control portion 51B in order to control the HDD 115. Thus, the guest control portion 53B can control the HDD 115 of the MFP 100.

The emulate portion 55B is a task formed in the case where the CPU 111 executes an emulate program. The emulate program is an application program compatible with the first operating system program. The emulate portion 55B is a virtual device for the guest control portion 53B and emulates the control of the hardware resources except for the HDD 115 by the host control portion 51B. The emulate portion 55B allows the guest control portion 33B to function as a virtual machine. Thus, the guest control portion 53B can control the hardware resources included in the MFP 100.

The first application portion 57 is a task formed in the case where the CPU 111 executes the first application program compatible with the first operating system program. The first application portion 57 controls the host control portion 51B, thereby being capable of controlling the hardware resources included in the MFP 100.

Each of the first application portion 57B and the emulate portion 55B can control the host control portion 51B and is managed by the host control portion 51B.

The second application portion 59 is a task formed in the case where the CPU 111 executes the second application program compatible with the second operating system program. The second application portion 59 controls the guest control portion 53B, thereby being capable of controlling the hardware resources included in the MFP 100.

The first application portion 57B includes a mode switching portion 77 that switches the operation modes of the MFP 100, a stop instruction portion 61B, an image processing portion 79 and an activation instruction portion 71B. In the case where switching the operation mode from the normal mode to the power saving mode, the mode switching portion 77 outputs a power saving switch signal, indicating that the operation mode has been switched to the power saving mode, to the stop instruction portion 61B. In the case where switching the operation mode from the power saving mode to the normal mode, the mode switching portion 77 outputs a normal switch signal, indicating that the operation mode has been switched to the normal mode, to the activation instruction portion 71B. In response to reception of the power saving switch signal from the mode switching portion 77, the stop instruction portion 61B controls the host control portion 51B and stops the hardware resources except for the RAM 114. In response to reception of the normal switch signal from the mode switching portion 77, the activation instruction portion 71B controls the host control portion 51B and activates the hardware resources.

In the case where the hardware resources except for the RAM 114 are stopped by the stop instruction portion 61B of the first application portion 57, the host control portion 51B stops the hardware resources except for the RAM 114 and the HDD 115. The host control portion 51B includes a hypervisor 91. The hypervisor 91 includes a stop portion 67B, a transfer portion 63B, an access destination conversion portion 83, an activation portion 69B and a data recovery portion 73B. In the case where the hardware resources except for the RAM 114 are stopped by the stop instruction portion 61B, on the condition that no access to the HDD 115 by the virtual device driver 54 included in the guest control portion 53B is present, the transfer portion 63B stores the data, stored in the predetermined region of the HDD 115, in the image region of the RAM 114. Specifically, in the case where a system call for controlling the HDD 115 is not input by the virtual device driver at a time point at which the hardware resources except for the RAM 114 are stopped by the stop instruction portion 61B, the transfer portion 63B stores the data, stored in the predetermined region of the HDD 115, in the image region of the RAM 114. In the case where a system call for controlling the HDD 115 is input by the virtual device driver 54 at the time point at which the hardware resources except for the RAM 114 are stopped by the stop instruction portion 61B, the transfer portion 63B waits until the control of the HDD 115 in accordance with the system call ends. In response to the end of the control of the HDD 115, the transfer portion 63B stores the data, stored in the predetermined region of the HDD 115, in the image region of the RAM 114. The predetermined region of the HDD 115 can be one or more predetermined partitions among a plurality of partitions of the HDD 115. The transfer portion 63B reads out the data stored in the partition as image data and stores the data in the image region of the RAM 114. In response to completion of the storage of the data, stored in the HDD 115, in the RAM 114, the transfer portion 63B outputs a transfer completion signal to each of the stop portion 67B and the access destination conversion portion 83B.

In response to reception of the transfer completion signal from the transfer portion 63B, the stop portion 67B stops the HDD 115. Specifically, the stop portion 67B cuts off the power supplied to the HDD 115.

After the operation mode is switched to the power saving mode by the first application portion 57B, the transfer portion 63B does not store the data, stored in the predetermined region of the HDD 115, in the image region of the RAM 114 until a system call, for controlling the HDD 115, input by the virtual device driver 54 is no longer present. In other words, during a period in which the transfer portion 63B is controlling the HDD 115 in accordance with the system call, for controlling the HDD 115, input by the virtual device driver 54, the transfer portion 63B does not store the data, stored in the predetermined region of the HDD 115, in the image region of the RAM 114. Therefore, the changed data, which is created in the case where the data stored in the HDD 115 is changed by the virtual device driver 54, can be stored in the image region of the RAM 114. Thus, the data stored in the image region of the RAM 114 and the data stored in the HDD 115 are the same at time points at which the transfer portion 63B starts and ends storing the data, stored in the HDD 115, in the RAM 114, so that the same data as the data stored in the HDD 115 can be stored in the RAM 114.

In response to reception of the transfer completion signal from the transfer portion 63B, the access destination conversion portion 83B converts the system call, for controlling the HDD 115, input by the virtual device driver 54 into the access to the image region of the RAM 114. Thus, with the HDD 115 stopped, the guest control portion 53B can control the HDD 115. The system call, for controlling the HDD 115, input by the virtual device driver 54 is switched by the access destination conversion portion 83A to the control of the RAM 114, so that the guest control portion 53B can perform the same control as the control performed in the case where the guest control portion 53B controls the HDD 115.

In response to activation of the hardware resources by the activation instruction portion 71B included in the first application portion 57B, the activation portion 69B activates the hardware resources including the HDD 115. The activation of the HDD 115 will be explained here. Specifically, the activation portion 69B supplies the power to the HDD 115. When the HDD 115 is activated, the activation portion 69B outputs an activation completion signal to the data recovery portion 73B.

In response to reception of the activation completion signal from the activation portion 69B, on the condition that no system call, for controlling the HDD 115, input by the virtual device driver 54 is present, the data recovery portion 73B stores the data, stored in the image region of the RAM 114, in the predetermined region of the HDD 115. Specifically, in the case where the system call, for controlling the HDD 115, is not input by the virtual device driver 54 at a time point at which the activation completion signal is received from the activation portion 69B, the data recovery portion 73B stores the data, stored in the image region of the RAM 114, in the predetermined region of the HDD 115. In the case where the system call, for controlling the HDD 115, is input by the virtual device driver 54 at a time point at which the activation completion signal is received from the activation portion 69B, the data recovery portion 73B waits until the control of the HDD 115 in accordance with the system call, for controlling the HDD 115, input by the virtual device driver 54 ends. Then, in response to the end of the control of the HDD 115 in accordance with the system call, for controlling the HDD 115, input by the virtual device driver 54, the data recovery portion 73B stores the data, stored in the image region of the RAM 114, in the predetermined region of the HDD 115. The data recovery portion 73B stores the data, stored in the image region of the RAM 114, in the predetermined region of the HDD 115 as image data. In response to completion of the storage of the data, stored in the image region of the RAM 114, in the HDD 115, the data recovery portion 73B outputs a recovery completion signal to the access destination conversion portion 83B.

After the operation mode is switched to the normal mode, the data recovery portion 71B does not store the data, stored in the image region of the RAM 114, in the predetermined region of the HDD 115 until the system call, for controlling the HDD 115, input by the virtual device driver 54 is no longer present. In other words, during a period in which the system call, for controlling the HDD 115, is input by the virtual device driver 54, the data recovery portion 73B does not store the data, stored in the image region of the RAM 114, in the predetermined region of the HDD 115. Therefore, the changed data, which is created in the case where the data stored in the image region of the RAM 114 is changed by the virtual device driver 54, can be stored in the predetermined region of the HDD 115. Thus, the data stored in the image region of the RAM 114 and the data stored in the HDD 115 are the same at time points at which the data recovery portion 73B starts and ends storing the data, stored in the image region of the RAM 114, in the HDD 115, so that the same data as the data stored in the image region of the RAM 114 can be stored in the predetermined region of the HDD 115.

After receiving the recovery completion signal from the data recovery portion 73B, the access destination conversion portion 83B does not convert the system call, for controlling the HDD 115, input by the virtual device driver 54 into the access to the image region of the RAM 114. Thus, the CPU 111 can control the HDD 115 in accordance with the system call, for controlling the HDD 115, input by the virtual device driver 54.

FIG. 13 is a flow chart showing one example of a flow of an operation mode switching process in accordance with one or more embodiments. The operation mode switching process is a process executed by the CPU 111 in the case where the CPU 111 executes an operation mode switching program stored in the ROM 113, the HDD 115 or the CD-ROM 118. The operation mode switching program is part of the mode switching program and part of the first application program. Referring to FIG. 13, a difference from the operation mode switching process shown in FIG. 5 is that the steps S07 to S11, and the steps S14 to S19 are deleted. The other process is the same as the process shown in FIG. 5. Therefore, a description thereof will not be repeated.

In the step S06, the CPU 111 stops the hardware resources except for the RAM 114, and the process returns to the step S03. In the step S13, the hardware resources are activated, and the process returns to the step S03.

Figure 14:
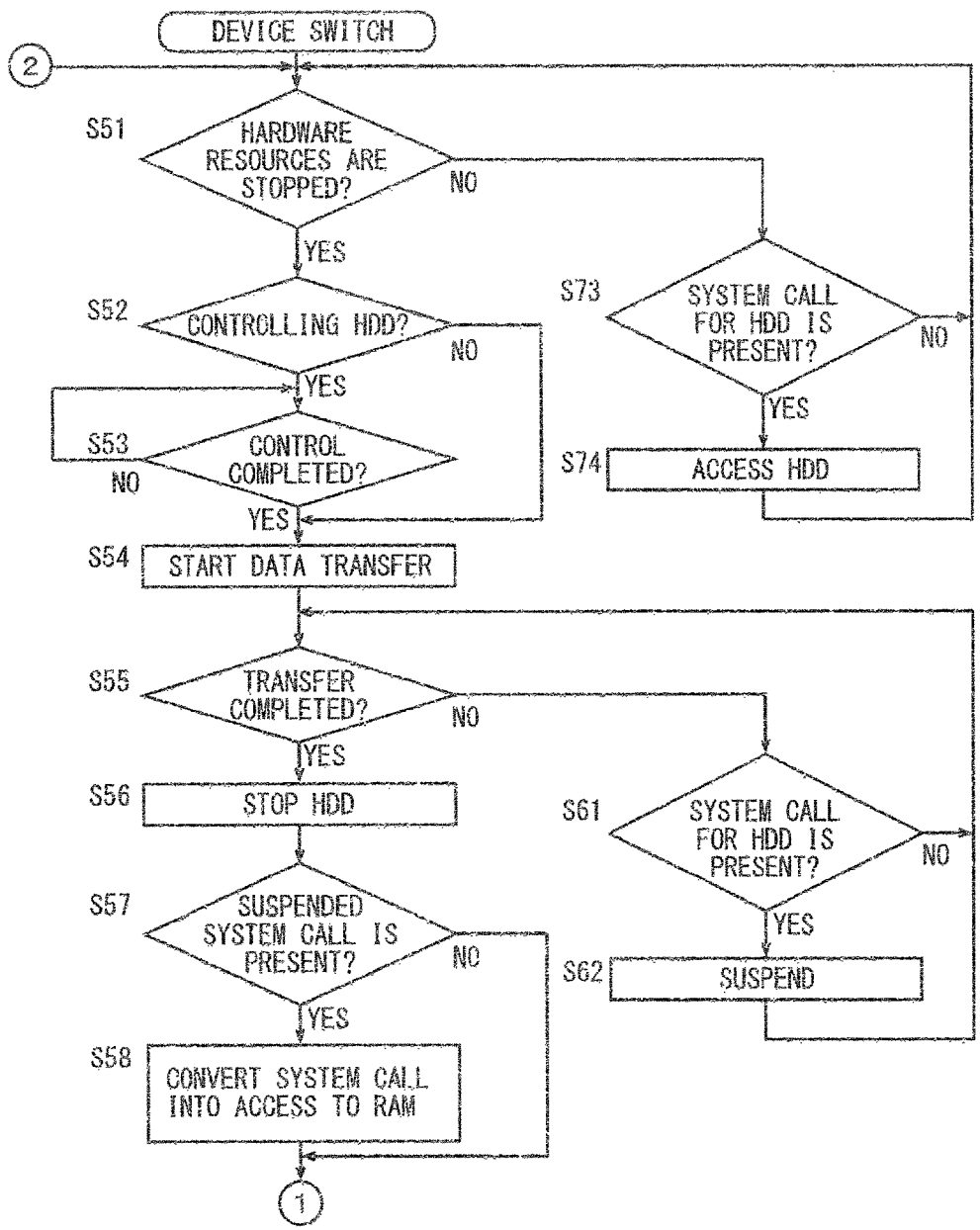
FIG. 14 is a first flow chart showing one example of a flow of an operation mode switching process in accordance with one or more embodiments.
Figure 15:
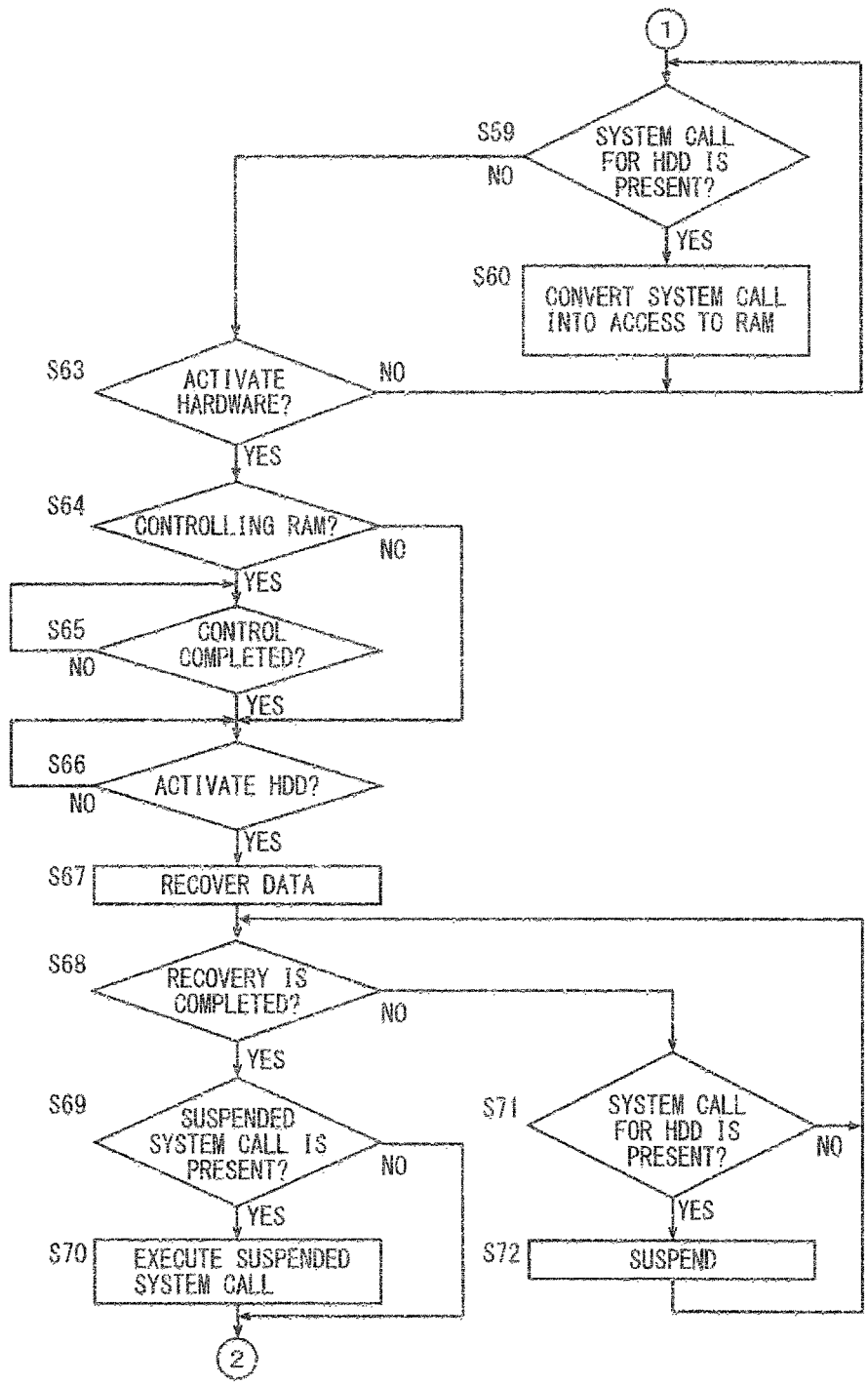
FIG. 15 is a second flow chart showing one example of the flow of the operation mode switching process in accordance with one or more embodiments.

FIGS. 14 and 15 are flow charts showing one example of a flow of a device switching process in accordance with one or more embodiments. The device switching process is a process executed by the CPU 111 in the case where the CPU 111 executes a second operating system program stored in the ROM 113, the HDD 115 or the CD-ROM 118.

Referring to FIGS. 14 and 15, the CPU 111 determines whether the hardware resources have been stopped by a task formed by the execution of the operation mode switching program (step S51). If the CPU 111 has received a command of stopping the hardware resources, the process proceeds to the step S52. If not, the process proceeds to the step S73. In the step S73, the CPU 111 determines whether a system call for controlling the HDD 115 has been received from the guest control portion 53B. If the CPU 111 has received the system call for controlling the HDD 115 from the guest control portion 53B, the process proceeds to the step S74. If not, the process returns to the step S51. In the step S74, the CPU 111 accesses the HDD 115 by controlling the HDD 115 in accordance with the system call, and the process returns to the step S51.

In the step S52, the CPU 111 determines whether the CPU 111 is controlling the HDD 115. If the CPU 111 is controlling the HDD 115, the process proceeds to the step S53. If not, the process proceeds to the step S54. In the step S53, the CPU 111 determines whether the control of the HDD 115 has been completed. The process waits until the control of the HDD 115 is completed (NO in the step S53). If the control of the HDD 115 is completed (YES in the step S53), the process proceeds to the step S54. In the step S54, the CPU 111 starts transferring data. The CPU 111 starts a process of storing the data, stored in the predetermined region of the HDD 115, in the image region of the RAM 114 as image data. In the next step S55, the CPU 111 determines whether the process of transferring the data has been completed. If the process of transferring the data is completed, the process proceeds to the step S56. If not, the process proceeds to the step S61.

In the step S61, the CPU 111 determines whether the system call for controlling the HDD 115 has been received from the guest control portion 53B. If the system call for the HDD 115 is received from the guest control portion 53B, the process proceeds to the step S62. If not, the process returns to the step S55. In the step S62, the CPU 111 suspends the system call, and the process returns to the step S55.

In the step S56, the CPU 111 stops the HDD 115, and the process proceeds to the step S57. In the step S57, the CPU 111 determines whether the suspended system call is present. In the step S62, if the system call for controlling the HDD 115 is suspended, the process proceeds to the step S58. If not, the process proceeds to the step S59. In the step S58, the CPU 111 converts the suspended system call into the access to the image region of the RAM 114 and accesses the RAM 114.

In the next step S59, the CPU 111 determines whether the system call for controlling the HDD 115 has been received from the guest control portion 53B. If the system call for the HDD 115 is received from the guest control portion 53B, the process proceeds to the step S60. If not, the process proceeds to the step S63. In the step S60, the CPU 111 converts the system call into the access to the image region of the RAM 114 and accesses the RAM 114. Then, the process returns to the step S59.

In the step S63, the CPU 111 determines whether the hardware resources have been activated by the task formed by the execution of the operation mode switching program. If the CPU 111 has received a command of activating the hardware resources, the process proceeds to the step S64. If not, the process returns to the step S59.

In the step S64, the CPU 111 determines whether the CPU 111 is controlling the RAM 114. If the CPU 111 is controlling the RAM 114, the process proceeds to the step S65. If not, the process proceeds to the step S66. In the step S65, the process waits until the control of the RAM 114 is completed (NO in the step S65). If the control of the RAM 114 is completed (YES in the step S65), the process proceeds to the step S66.

In the step S66, the process waits until the HDD 115 is activated (NO in the step S66). If the HDD 115 is activated (YES in the step S66), the process proceeds to the step S67. In the step S67, the CPU 111 starts recovering the data. The CPU 111 starts a process of storing the data, stored in the image region of the RAM 114, in the predetermined region of the HDD 115 as image data. In the next step S68, the CPU 111 determines whether the process of recovering the data has been completed. If the process of recovering the data is completed, the process proceeds to the step S69. If not, the process proceeds to the step S71.

In the step S71, the CPU 111 determines whether the system call for controlling the HDD 115 has been received from the guest control portion 53B. If the system call for the HDD 115 is received from the guest control portion 53B, the process proceeds to the step S72. If not, the process returns to the step S68. In the step S72, the CPU 111 suspends the system call, and the process returns to the step S68.

In the step S60, the CPU 111 determines whether the suspended system call is present. In the step S72, if the system call for controlling the HDD 115 is suspended, the process proceeds to the step S70. If not, the process returns to the step S51. In the step S70, the CPU 111 executes the suspended system call, and the process returns to the step S51.

The MFP 100 of one or more embodiments includes the volatile RAM 114, the non-volatile HDD 115 and the CPU 111, and the CPU 111 executes the first operating system program, the second operating system program, the emulate program, the first application program and the second application program. The host operating system that executes the first operating system program includes the hypervisor that controls the access to the RAM 114 and the HDD 115 by the guest operating system that executes the second operating system program. The guest operating system includes the virtual driver for controlling the hypervisor and accessing the HDD 115. The hypervisor, before the HDD 115 is stopped by the task formed by the execution of the first application program, allows the data, stored in the predetermined partition of the HDD 115, to be stored in the image region of the RAM 115. Further, after the HDD 115 is stopped, the hypervisor converts the access to the HDD 115 by the virtual driver into the access to the image region of the RAM 114. Therefore, the second operating system can access the data stored in the HDD 115 even after the HDD 115 is stopped. In other words, in the power saving mode, the power consumed by the HDD 115 is reduced, and the access to the HDD 115 by the task formed by the execution of the second application program is switched to the access to the RAM 114. Therefore, the task formed by the execution of the second application program can access the data stored in the HDD 115.

Further, in response to an instruction of activating the HDD 115 by the task formed by the execution of the first application program, the hypervisor activates the HDD 115.

In response to the activation of the HDD 115, the hypervisor allows the data stored in the image region of the RAM 114 to be stored in the predetermined partition of the HDD 115. After the data is stored in the HDD 115, the hypervisor does not convert the access to the HDD 115 by the virtual driver into the access to the image region of the RAM 114. Therefore, after the HDD 115 is activated, the data stored in the image region of the RAM 114 is stored in the predetermined partition of the HDD 115. Therefore, during a period in which the HDD 115 is stopped, the changed data created in the case where the data is changed in the RAM 114 can be stored in the HDD 115.

In one or more embodiments, the MFP 100 has been described as one example of the image processing apparatus. However, the image processing apparatus may be a facsimile device, a scanner device, a camera or the like, for example, as long as it includes a function of processing image data. Further, the one or more embodiments of the present invention can be regarded as the operation mode switching method for allowing the MFP 100 to execute the processes shown in FIGS. 5 to 7, FIGS. 9 to 11 and FIGS. 13 to 15, and the operation mode switching program for allowing the CPU 111 that controls the MFP 100 to perform the operation mode switching method.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing apparatus comprising:
   a hardware processor;
   a volatile first storage; and
   a non-volatile second storage;
   wherein the hardware processor includes:
      a host controller that is formed by execution of a first operating system program and controls the first storage and the second storage,
      a guest controller that is formed by execution of a second operating system program,
      an emulator that emulates access to the first storage and the second storage by the host controller such that the guest controller accesses the first storage and the second storage, and
      an application portion that is formed by execution of an application program and controls the host controller in order to access the first storage and the second storage,
         any one of the application portion and the emulator includes a transfer portion that, before the application portion stops the second storage, stores data, stored in a predetermined region of the second storage, in a certain region of the first storage, and
         the emulator includes an access destination converter that, after the second storage is stopped by the application portion, converts access to the second storage by the guest controller into access to the certain region of the first storage.

2. The image processing apparatus according to claim 1, wherein
   the application portion includes
      the transfer portion,
      a stop starting notifier that, before the second storage is stopped, notifies the emulator of a stop of the second storage,
      a transfer completion notifier that, after the data is stored in the first storage by the transfer portion, notifies the emulator of completion of storage of the data in the second storage, and
      a stopper that, after the data is stored in the first storage by the transfer portion, controls the host controller in order to stop the second storage,
   the transfer portion, in response to a response by the emulator to notification of the stop of the second storage, allows the first storage to store the data,
   the emulator includes a stop responder that, on the condition that no access to the second storage by the guest controller is present, responds to the notification of the stop of the second storage from the application portion, and
   the access destination converter, in response to notification of completion of the storage of the data in the second storage from the application portion, converts the access to the second storage by the guest controller into the access to the certain region of the first storage.

3. The image processing apparatus according to claim 1, wherein
   the application portion includes a stop instructor that instructs the emulator to stop the second storage,
   the emulator includes
      the transfer portion, and
      the stopper that, after the data is stored in the first storage by the transfer portion, controls the host controller in order to stop the second storage,
   the transfer portion, on the condition that no access to the second storage by the guest controller is present, allows the first storage to store data, and
   the access destination converter, after the data is stored in the first storage by the transfer portion, converts the access to the second storage by the guest controller into the access to the certain region of the first storage.

4. The image processing apparatus according to any one of claim 1, wherein
   any one of the application portion and the emulator includes a data recoverer that, in the case where the application portion activates the second storage being stopped, stores data, stored in the certain region of the first storage, in the predetermined region of the second storage, and
   the emulator, after the second storage is activated by the application portion, does not further convert the access to the second storage by the guest controller into the access to the certain region of the first storage.

5. The image processing apparatus according to claim 1, wherein
   the application portion includes
      the data recoverer,
      an activator that controls the host controller in order to activate the second storage being stopped,
      an activation start notifier that, in response to activation of the second storage, notifies the emulator of the activation of the second storage, and
      an activation completion notifier that, after data is stored in the second storage by the data recoverer, notifies the emulator of completion of storage of the data in the second storage,
   the data recoverer, in response to a response by the emulator to notification of the activation of the second storage, allows the second storage to store the data, and the access destination converter, after being notified of the completion of the storage of the data in the second storage by the application portion, does not convert access to the second storage by the guest controller into access to the certain region of the first storage.

6. The image processing apparatus according to claim 1, wherein
the application portion includes an activation instructor that instructs the emulator to activate the second storage being stopped,
the emulator includes
the data recoverer, and
an activator that, in response to an instruction of activation of the second storage by the application portion, activates the second storage,
the data recoverer, after the second storage is activated, allows the second storage to store data, and
the access destination converter, after the data is stored in the second storage by the data recoverer, does not convert access to the second storage by the guest controller into access to the certain region of the first storage.

7. The image processing apparatus according to any one of claim 1, wherein
the application portion includes
a mode switcher that switches an operation mode to a power saving mode in which power consumption is lower than power consumption in a normal mode, and
an image processor that processes image data by using a predetermined image region of the first storage in the normal mode, and does not process the image data in the power saving mode, and
the certain region of the first storage is an image region used by the image processor in the normal mode.

8. An image processing apparatus comprising:
a hardware processor,
a volatile first storage; and
a non-volatile second storage, wherein
the hardware processor including:
a host controller that is formed by execution of a first operating system program and controls the first storage and the second storage;
a guest controller that is formed by execution of a second operating system program; and
an application portion that is formed by execution of an application program and controls the host controller in order to access the first storage and the second storage,
wherein the host controller includes
a hypervisor that controls access to the first storage and the second storage by the guest controller,
the guest controller includes a virtual driver for controlling the hypervisor in order to access the second storage, and
the hypervisor includes
a transfer portion that, before the second storage is stopped by the application portion, stores data, stored in a predetermined region of the second storage, in a certain region of the first storage, and
an access destination converter that, after the second storage is stopped, converts access to the second storage by the virtual driver into access to the certain region of the first storage.

9. The image processing apparatus according to claim 8, wherein the transfer portion, on the condition that no access to the second storage by the virtual driver is present, allows the first storage to store data,
the hypervisor further includes a stopper that, after the data is stored in the first storage by the transfer portion, stops the second storage, and
the access destination converter, after the data is stored in the first storage by the transfer portion, converts access to the second storage by the virtual driver into access to the certain region of the first storage.

10. The image processing apparatus according to claim 8, wherein
the hypervisor further includes
an activator that, in response to activation of the second storage by the application portion, activates the second storage, and
a data recoverer that, in response to the activation of the second storage, stores data, stored in the certain region of the first storage, in the predetermined region of the second storage, and
the access destination converter, after the data is stored in the second storage by the data recoverer, converts access to the second storage by the virtual driver into access to the certain region of the first storage.

11. A non-transitory computer-readable recording medium encoded with an operation mode switching program that includes an application program and an emulate program which are executed by a computer that controls an image processing apparatus,
the image processing apparatus comprising:
a volatile first storage; and
a non-volatile second storage,
the computer comprising:
a host operating system that executes a first operating system program and controls the first storage and the second storage;
a guest operating system that executes a second operating system program;
an emulate task that is formed by execution of the emulate program, and emulates access to the first storage and the second storage by the host operating system such that the guest operating system accesses the first storage and the second storage; and
an application task that is formed by execution of the application program and controls the host operating system in order to access the first storage and the second storage, and
the computer causing:
any one of the application task and the emulate task to perform a transfer step of, before the application task stops the second storage, storing data, stored in a predetermined region of the second storage, in a certain region of the first storage, and
the emulate task to perform an access destination conversion step of, after the second storage is stopped by the application task, converting access to the second storage by the guest operating system into access to the certain region of the first storage.

12. A non-transitory computer-readable recording medium encoded with an operation mode switching program that is executed by a computer that controls an image processing apparatus,
the image forming apparatus comprising:
a volatile first storage; and
a non-volatile second storage, and
the computer comprising:

a host operating system that executes a first operating system program and controls the first storage and the second storage;
a guest operating system that executes a second operating system program; and
an application task that is formed by execution of an application program and controls the host operating system in order to access the first storage and the second storage, wherein
the host operating system includes a hypervisor that is formed in the case where the computer executes the operation mode switching program included in the first operating system program, and controls access to the first storage and the second storage by the guest operating system,
the guest operating system includes a virtual driver for controlling the hypervisor in order to access the second storage, and
the guest operating system causes the hypervisor to perform
a transfer step of, before the second storage is stopped by the application task, storing data, stored in a predetermined region of the second storage, in a certain region of the first storage, and
an access destination conversion step of, after the second storage is stopped, converting access to the second storage by the virtual driver into access to the certain region of the first storage.

* * * * *